(12) United States Patent
Nishikawa

(10) Patent No.: US 10,892,956 B2
(45) Date of Patent: Jan. 12, 2021

(54) DEVICE MANAGEMENT SERVER, CONTROL METHOD FOR THE SAME, AND MEDIUM

(71) Applicant: CANON KABUSHIKI KAISHA, Tokyo (JP)

(72) Inventor: Satoshi Nishikawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/781,630

(22) Filed: Feb. 4, 2020

(65) Prior Publication Data
US 2020/0274776 A1 Aug. 27, 2020

(30) Foreign Application Priority Data
Feb. 27, 2019 (JP) .................................. 2019-033873

(51) Int. Cl.
*H04L 12/24* (2006.01)
*H04L 29/08* (2006.01)
*G06F 9/445* (2018.01)
*G06F 8/60* (2018.01)

(52) U.S. Cl.
CPC .............. *H04L 41/32* (2013.01); *H04L 67/10* (2013.01); *G06F 8/60* (2013.01); *G06F 9/445* (2013.01)

(58) Field of Classification Search
CPC ...................................................... H04L 41/32
USPC ............................................................ 709/223
See application file for complete search history.

(56) References Cited

U.S. PATENT DOCUMENTS

| | | | | |
|---|---|---|---|---|
| 6,567,793 B1* | 5/2003 | Hicks | ..................... | G06F 21/10 380/279 |
| 7,236,958 B2* | 6/2007 | Wong | ..................... | G06F 21/10 380/201 |
| 8,898,469 B2* | 11/2014 | Chan | ..................... | G06F 21/10 713/169 |
| 8,935,380 B2* | 1/2015 | Arnott | ................... | G06F 21/577 709/224 |
| 8,984,293 B2* | 3/2015 | Layson | ................. | G06F 21/121 713/182 |
| 9,058,230 B1* | 6/2015 | van Rietschote | ... | G06F 11/1048 |
| 2003/0161335 A1* | 8/2003 | Fransdonk | ............. | G06Q 20/12 370/401 |
| 2005/0022157 A1* | 1/2005 | Brendle | ................. | G06Q 10/10 717/104 |

(Continued)

FOREIGN PATENT DOCUMENTS

JP 2017-157200 A 9/2017

OTHER PUBLICATIONS

Wikipedia, "Product key", 2020 (Year: 2020).*

*Primary Examiner* — Ondrej C Vostal
(74) *Attorney, Agent, or Firm* — Canon U.S.A., Inc. IP Division

(57) ABSTRACT

A device management server that manages information regarding an application associated with a product key, and information regarding a panel application includes a first creation unit configured to create a first task for distributing to a network device the application associated with the product key, and a second creation unit configured to create a second task for distributing the panel application to the network device, and in a case where the second task is executed, acquires version information regarding the second application installed on the network device, and distributes a new version of the panel application.

10 Claims, 22 Drawing Sheets

(56) References Cited

U.S. PATENT DOCUMENTS

| | | | | |
|---|---|---|---|---|
| 2008/0189549 | A1* | 8/2008 | Hughes | G06F 21/10 713/171 |
| 2009/0199154 | A1* | 8/2009 | Baratta | G06F 8/34 717/100 |
| 2010/0324983 | A1* | 12/2010 | Etchegoyen | H04L 63/062 705/14.23 |
| 2010/0325025 | A1* | 12/2010 | Etchegoyen | G06Q 30/04 705/34 |
| 2012/0110156 | A1* | 5/2012 | Guru | H04L 67/125 709/223 |
| 2012/0204269 | A1* | 8/2012 | Gardner | G06F 21/10 726/26 |
| 2013/0124867 | A1* | 5/2013 | Clayton, II | H04L 9/3247 713/171 |
| 2014/0200965 | A1* | 7/2014 | McConnell | G06Q 30/0206 705/7.35 |
| 2015/0081837 | A1* | 3/2015 | Bernier | H04W 4/50 709/217 |
| 2017/0206574 | A1* | 7/2017 | Sharma | G06Q 30/0643 |
| 2018/0246732 | A1* | 8/2018 | Puri | H04L 9/3242 |

\* cited by examiner

FIG.6A

```
TEMPLATE CREATION                              ✕
TEMPLATE NAME  [INSTALLATION A]
PRODUCT KEY    [ XXXXXX ]   [ACQUIRE INFORMATION]

APPLICATION NAME    VERSION    ID
    ☐ APPLICATION B       1.0     1001
    ☐ APPLICATION B       1.1     1002

[ NEXT ]
```

FIG.6B

```
TEMPLATE SELECTION                             ✕

TEMPLATE NAME
    [ INSTALLATION TEMPLATE A  ▼ ]
      INSTALLATION TEMPLATE B
      INSTALLATION TEMPLATE C

[ NEXT ]
```

FIG.6C

```
DEVICE SELECTION                               ✕
[SELECT ALL] [CANCEL ALL]
   DEVICE NAME  HOST NAME   IP ADDRESS      SERIAL NUMBER
☐  iR2200       cxxxn21     192.168.10.87   18993354
☐  iR2300       cxxxn31     192.168.10.100  18993344
☐  iR2800       cxxxn44     192.168.10.110  189933643

[ NEXT ]
```

FIG.6D

```
SCHEDULE SETTING                               ✕
SCHEDULE
● IMMEDIATELY EXECUTE
○ EXECUTE AT SPECIFIED DATE AND TIME
○ PERIODICALLY EXECUTE
                               [RETURN] [NEXT]
```

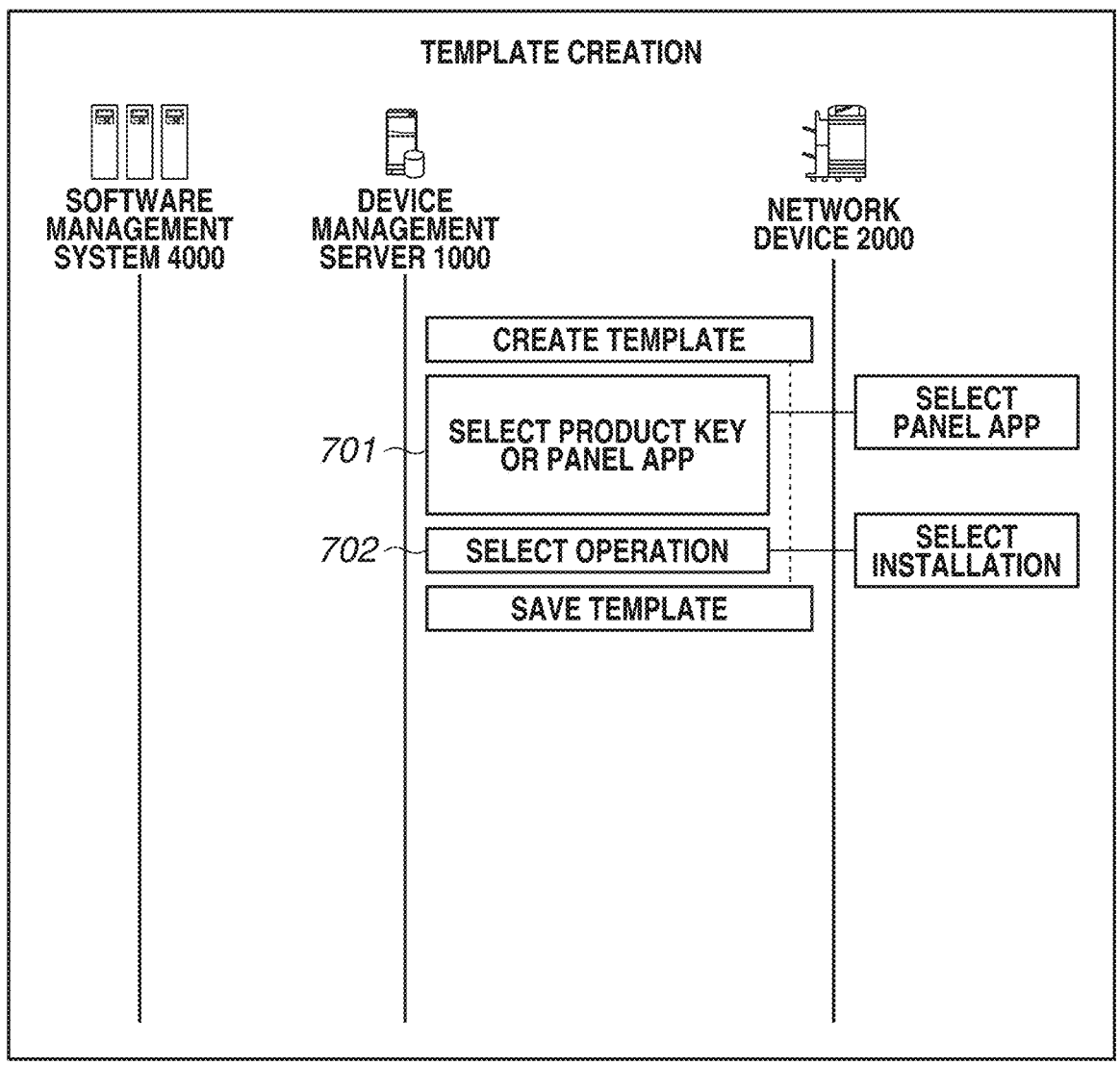

FIG.8

TEMPLATE CREATION ✕

TEMPLATE NAME  | INSTALLATION A |

TARGET APPLICATION
☐ PRODUCT KEY (SPECIFIED APPLICATION)
■ PANEL APPLICATION

NEXT

FIG.9A

```
CONFIRMATION                                    ×

DO YOU HOLD VERSION OF
     APPLICATION IN LATEST STATE?

YES (Y)      NO (N)
```

FIG.9B

```
SCHEDULE SETTING                                ×

SCHEDULE
  ○ IMMEDIATELY EXECUTE
  ○ EXECUTE AT SPECIFIED DATE AND TIME
  ● PERIODICALLY EXECUTE

00 O'CLOCK ON FIRST OF EACH MONTH

RETURN     NEXT
```

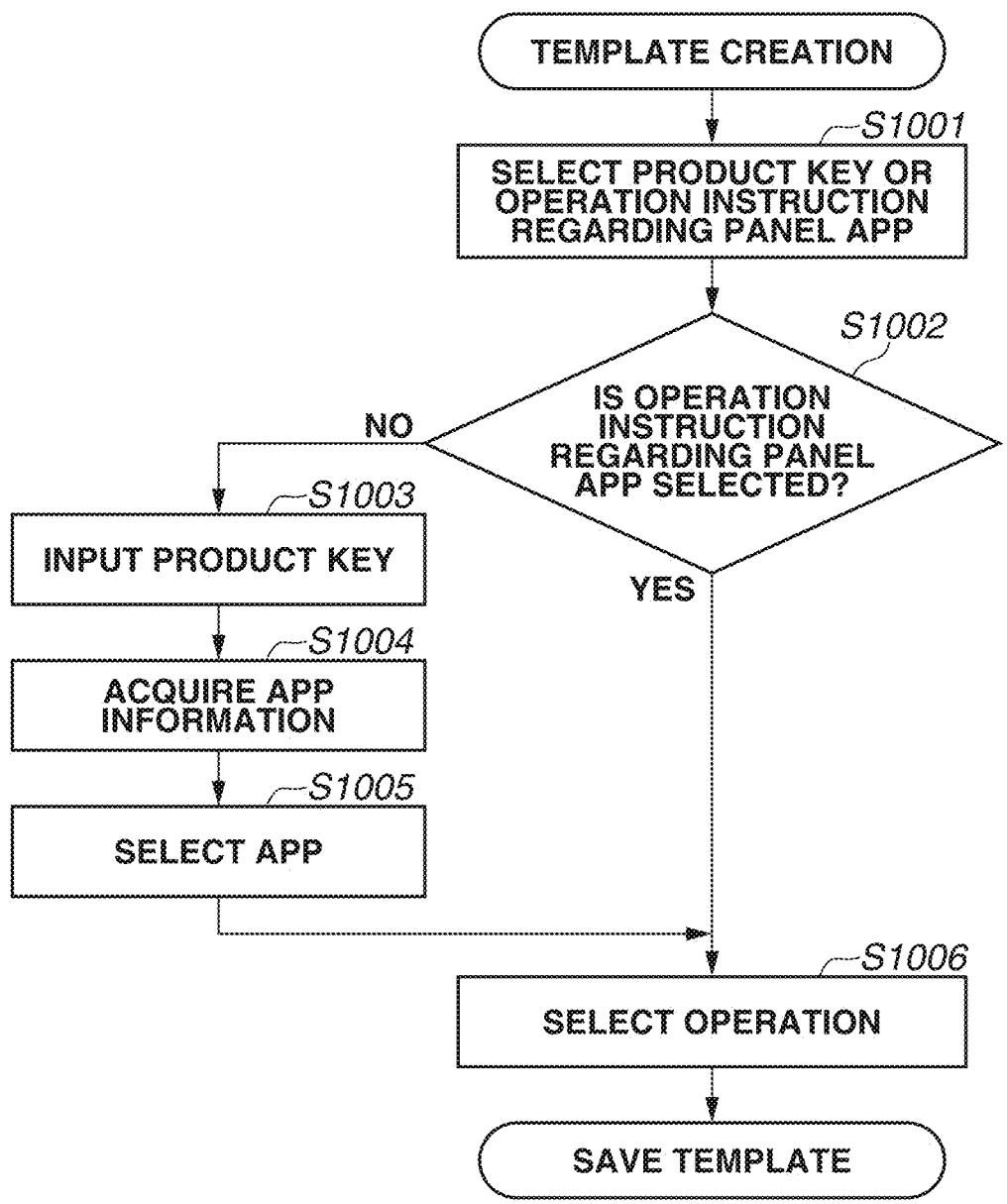

FIG.18A

TEMPLATE CREATION
TEMPLATE NAME [INSTALLATION A]
PANEL APPLICATION LIST

| APPLICATION NAME | ID |
|---|---|
| ☐ APPLICATION A | 0001 |
| ■ APPLICATION B | 0002 |
| ■ APPLICATION C | 0003 |

[NEXT]

FIG.18B

TEMPLATE CREATION
TEMPLATE NAME [INSTALLATION A]

PANEL APPLICATION TYPE
☐ PAID APPLICATION
■ FREE APPLICATION

[NEXT]

FIG.18C

TEMPLATE CREATION
TEMPLATE NAME [INSTALLATION A]
FREE PANEL APPLICATION LIST

| APPLICATION NAME | ID |
|---|---|
| ☐ APPLICATION D | 0004 |
| ☐ APPLICATION E | 0005 |
| ■ APPLICATION F | 0006 |

[NEXT]

FIG.18D

TEMPLATE CREATION
TEMPLATE NAME [INSTALLATION A]

PANEL APPLICATION ACQUISITION
☐ VIA DEVICE MANAGEMENT SERVER
■ DIRECTLY FROM DEVICE

ACQUISITION TIMING
○ IMMEDIATELY
○ SPECIFY THROUGH PANEL
● AT SHUTDOWN

[NEXT]

DEVICE MANAGEMENT SERVER, CONTROL METHOD FOR THE SAME, AND MEDIUM

BACKGROUND

Field of the Disclosure

The present disclosure relates to a device management server that manages a device such as an image processing apparatus connected to a network.

Description of the Related Art

Conventionally, a device management system including a device management server that acquires data such as operation information regarding a device, e.g., an image forming apparatus such as a printer or a multifunction peripheral, via a network and manages the data is known.

In recent years, in terms of an increase in network devices as management targets, and a reduction in cost and the maintainability of a device management server, the number of devices managed by a single device management server increases. The device management server in this device management system can also install an application on a network device. Generally, the device management server transmits a required license together with the application to the network device, and the network device performs an installation process for installing the application.

Generally, the device management system also creates in advance a template, which is the procedure of an operation to be executed, and based on the template, creates a task for which the date and time when processing is to be actually performed and a device are specified.

In the installation of the application, the device management system accesses a software management system in advance, acquires information regarding the application based on an identifier for a purchase (hereinafter referred to as a "product key"), and saves the information in a template. When a task is executed, based on the information regarding the application saved in the template, the device management system accesses the software management system, acquires the application, and installs the application.

Some device management system also registers an application itself in advance.

Japanese Patent Application Laid-Open No. 2017-157200 discusses a technique for displaying an available application on a device and being able to execute an application command including the installation of the application.

The conventional device management system has a form in which, when an application is installed, the device management system creates a template including information regarding an application associated with a product key and version information in advance, and the application is installed. Thus, the conventional device management system cannot perform management such that the device management system updates an application (hereinafter referred to as a "panel application") directly installed by the network device to the latest state or holds the latest state of the application.

SUMMARY

According to an aspect of the present disclosure, a device management server that manages information regarding a first application associated with a product key, and information regarding a second application that is not managed based on a product key includes at least one memory storing instructions, and at least one processor executing the instructions causing the device management server to create a first task for distributing to a network device a first application associated with a product key that can be selected by specifying the product key, create a second task for distributing to the network device a second application selected without specifying a product key, in a case where the second task is executed, acquire version information regarding the second application installed on the network device as a target, and based on the acquired version information, perform control to distribute a newer version of the second application to the target network device.

Further features of the present disclosure will become apparent from the following description of exemplary embodiments with reference to the attached drawings.

BRIEF DESCRIPTION OF THE DRAWINGS

FIGS. 6A, 6B, 6C, and 6D are diagrams illustrating display user interfaces (UIs) according to one or more aspect of the present disclosure.

FIGS. 7A and 7B are sequence diagrams regarding installation of an application according to one or more aspect of the present disclosure.

FIG. 8 is a diagram illustrating a display UI according to one or more aspect of the present disclosure.

FIGS. 9A and 9B are diagrams illustrating display UIs according to one or more aspect of the present disclosure.

FIG. 10 is a flowchart regarding template creation according to one or more aspect of the present disclosure.

FIGS. 18A, 18B, 18C, and 18D are diagrams illustrating examples of display UIs according to one or more aspect of the present disclosure.

DESCRIPTION OF THE EMBODIMENTS

Configuration of Device Management System

Figure 1:
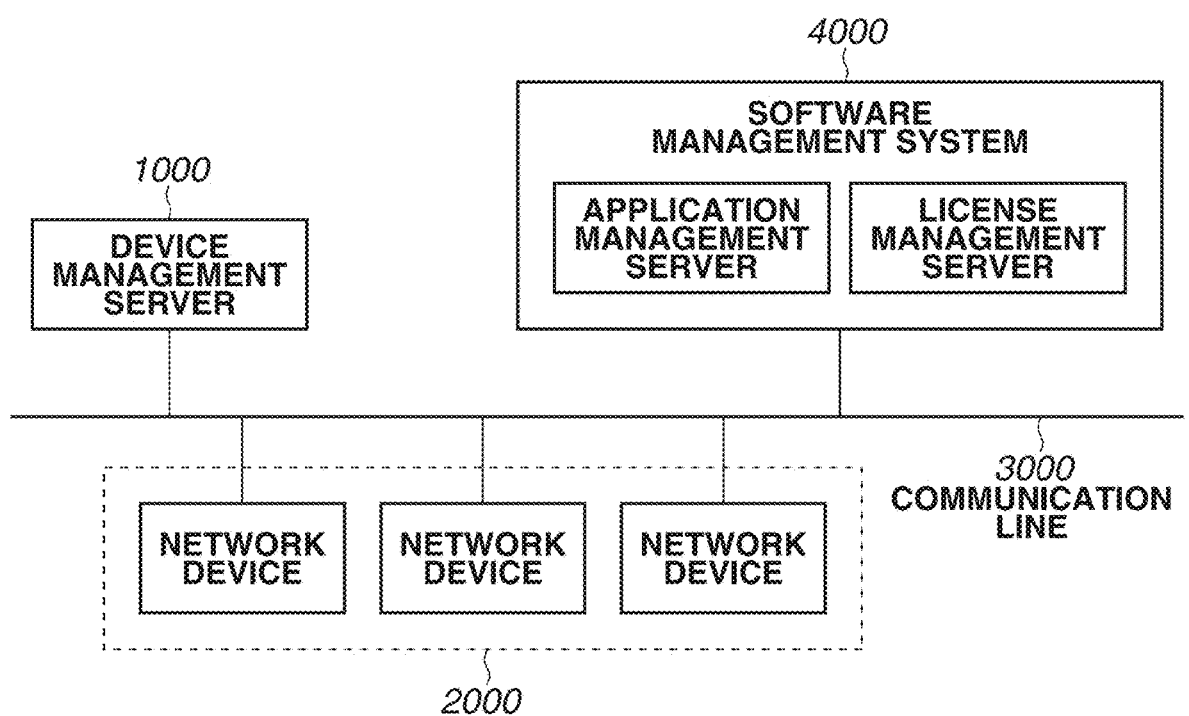
FIG. 1 is a schematic diagram illustrating a configuration of a device management system according to one or more aspect of the present disclosure.

FIG. 1 is a schematic diagram illustrating an example of the configuration of a device management system according to exemplary embodiments of the present disclosure.

A device management server 1000, a plurality of network devices 2000, and a software management system 4000 are connected to each other via a communication line 3000 such as a local area network (LAN) and the Internet.

Figure 3:
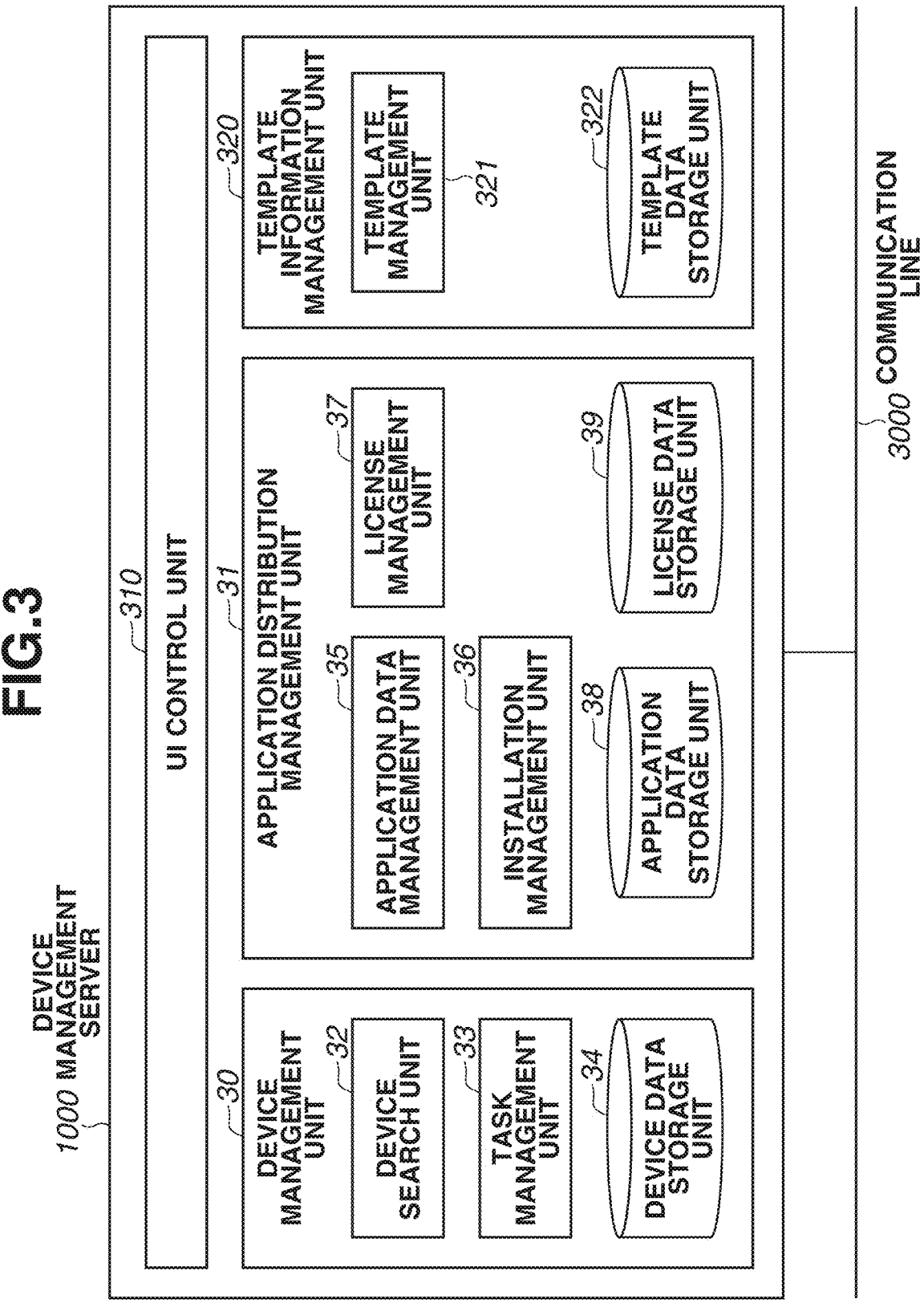
FIG. 3 is a block diagram illustrating a module configuration of software of the device management server.

The device management server 1000 is a server in which a device management unit 30, an application distribution management unit 31, a template information management unit 320, and a user interface (UI) control unit 310 illustrated in FIG. 3 operate to manage the network devices 2000.

Each network device 2000 is, for example, a multifunction peripheral (MFP). The network device 2000 receives print data via a network and performs printing on an actual sheet using a known printing technique such as an electrophotographic technique or an inkjet technique. The network device 2000 also has the functions of reading a document through a scanner, copying the read document, converting the read document into image data, and transmitting the image data by email. As a matter of course, the network device 2000 may also be a single-function printer without a scan function and a copy function. A function can also be added to the network device 2000 by installing an application on the network device 2000. The network device 2000 may be not only an MFP but also any of various Internet of Things (IoT) devices such as a network camera, various network household electrical appliances, and a medical device.

The software management system 4000, which also manages a panel application, is a system that manages software for installing an application on each network device 2000. The software management system 4000 is composed of, for example, an application management server and a license management server.

The device management server 1000 and these devices included in the software management system 4000 may be composed of a single apparatus, or may be composed of a plurality of apparatuses. The device management server 1000 and the software management system 4000 may be composed of a cloud server. For example, the software management system 4000 can also be constructed using a public cloud service.

Hardware Configuration of Device Management Server

Figure 2:
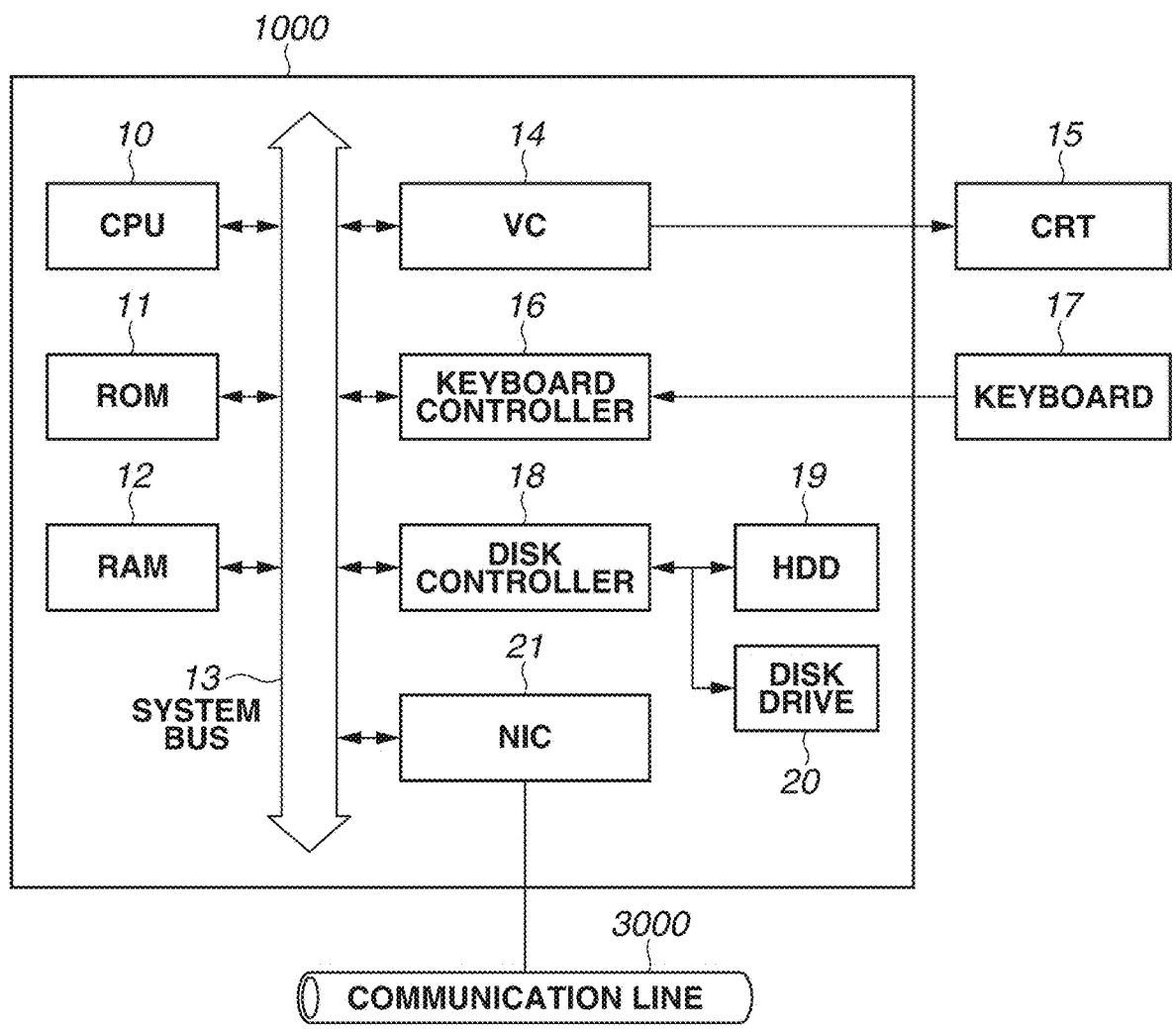
FIG. 2 is a configuration block diagram of a device management server.

FIG. 2 illustrates the hardware configuration of an information processing apparatus included in the device management server 1000.

Using a random-access memory (RAM) 12 as a work area, a central processing unit (CPU) 10 executes various programs such as an operating system (OS) and device management software stored in a read-only memory (ROM) 11 and a hard disk drive (HDD) 19. Components of the information processing apparatus are connected together via a system bus 13. The information processing apparatus includes a disk controller 18, a disk drive 20 on which a storage medium such as a Compact Disc Read-Only Memory (CD-ROM), a digital versatile disc (DVD), a magnetic tape, or an integrated circuit (IC) memory card can be mounted, a video card (VC) 14, and a display device (cathode ray tube (CRT)) 15. The information processing apparatus includes a keyboard controller 16, a keyboard 17, and a pointing device (not illustrated) such as a mouse. Additionally, the information processing apparatus communicates data with a device on the communication line 3000 via a network interface card (NIC) 21.

Software Configuration of Device Management Server

FIG. 3 illustrates an example of the module configuration of software such as the device management unit 30, the application distribution management unit 31, the UI control unit 310, and the template information management unit 320 that operate on the device management server 1000. This example of the module configuration performs processing described below achieved by executing the device management software.

The device management unit 30 includes a device search unit 32, a task management unit 33, and a device data storage unit 34.

The application distribution management unit 31 includes an application data management unit 35, an installation management unit 36, a license management unit 37, an application data storage unit 38, and a license data storage unit 39.

The template information management unit 320 includes a template management unit 321 and a template data storage unit 322.

The UI control unit 310 controls UIs of the device management unit 30, the application distribution management unit 31, and the template information management unit 320. The UI control unit 310 can also be achieved as a web-based application. In this case, the UI control unit 310 can be used through a web browser.

(1) Device Management Unit

The task management unit 33 has the function of executing a task generated by the device search unit 32 or the installation management unit 36 and stored in the device data storage unit 34. According to a schedule set for the task, the task management unit 33 instructs the device search unit 32 or the installation management unit 36 to execute the task.

Examples of the task of the device search unit 32 include a device search function for searching for any of the network devices 2000 using Simple Network Management Protocol (SNMP) or Internet Protocol (IP) broadcast or Service Location Protocol (SLP) multicast. At this time, the device search unit 32 searches for the network device 2000 at any timing.

Then, the device search unit 32 has the function of acquiring and changing device information such as a management information base (MIB) via the communication line 3000 such as a LAN. The device search unit 32 acquires device information such as a device name, a product name, and an IP address as a result of the device search and saves the device information in the device data storage unit 34.

The device data storage unit 34 is a data recording medium such as a database and saves table data such as a device list.

(2) Application Distribution Management Unit

The application data management unit 35 manages information and an application acquired from the software management system 4000 and saves the information and the application in the application data storage unit 38.

The installation management unit 36 receives an installation instruction, creates a command to install an application on any of the network devices 2000, and executes processing.

The license management unit 37 manages information and a license acquired from the software management system 4000 and saves the information and the license in the license data storage unit 39.

(3) Template Information Management Unit

The template management unit 321 manages information regarding a created template and saves data of the template information in the template data storage unit 322.

Software Configuration of Device

Figure 4:
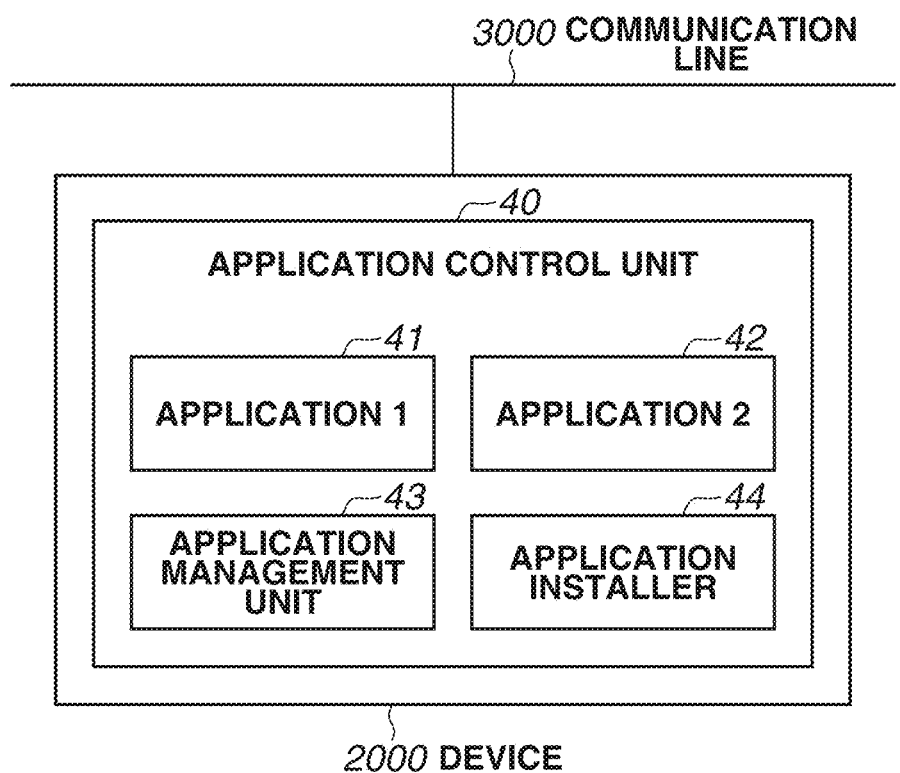
FIG. 4 is a block diagram illustrating a configuration of a device.

FIG. 4 is an example of the software configuration of an application control unit 40 that operates on each network device 2000.

The network device 2000 includes as a software module an application management unit 43 that manages a group of applications that can be dynamically installed. Applications 41 and 42 that achieve various functions operate under control of the application management unit 43.

In response to the fact that applications become embedded in the device 2000 by an application installer 44, the application management unit 43 adds the applications 41 and 42 as management targets. In response to the fact that application programs are deleted from the network device 2000, the application management unit 43 can remove the applications 41 and 42 from management targets.

The applications 41 and 42 cooperate with the network device 2000 to provide various functions to a user. Examples of the applications 41 and 42 can include an application for processing and compressing an image, an application for managing print restriction on a department basis, and a plug-in module embedded as a part of an application. Examples of the applications 41 and 42 also include an application for remotely managing the network device 2000, an application for controlling a unit such as a finisher of the network device 2000 to bind a book, and an application for converting and analyzing particular document data. Examples of the applications 41 and 42 also include a document creation program such as so-called word processing software, a schedule management program, a spreadsheet program, a database management program, and a server program for achieving a print service via the Internet.

Conventional Sequence for Installing Application

Figure 5A:
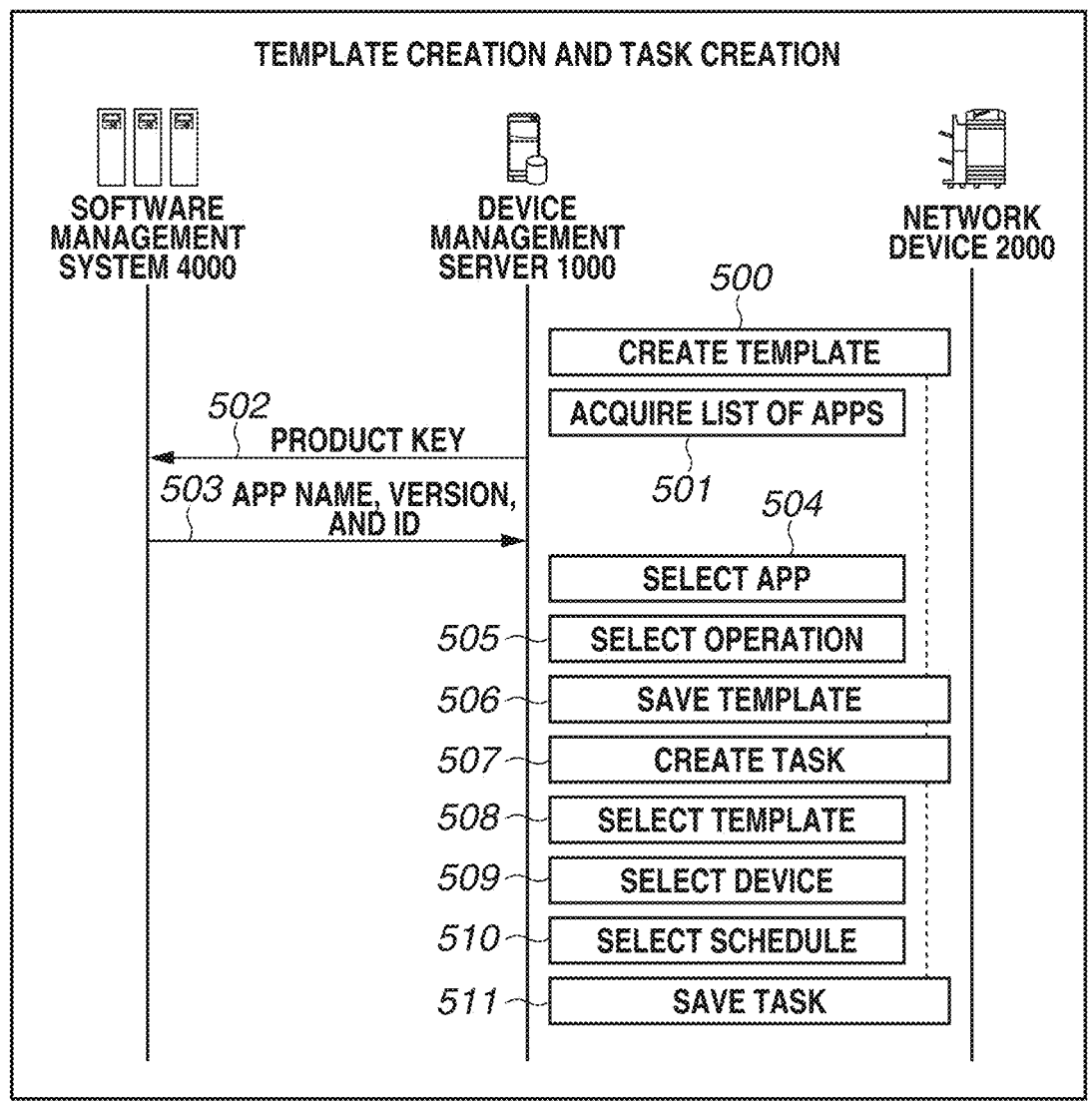
FIGS. 5A and 5B are sequence diagrams regarding conventional installation of an application.
Figure 5B:
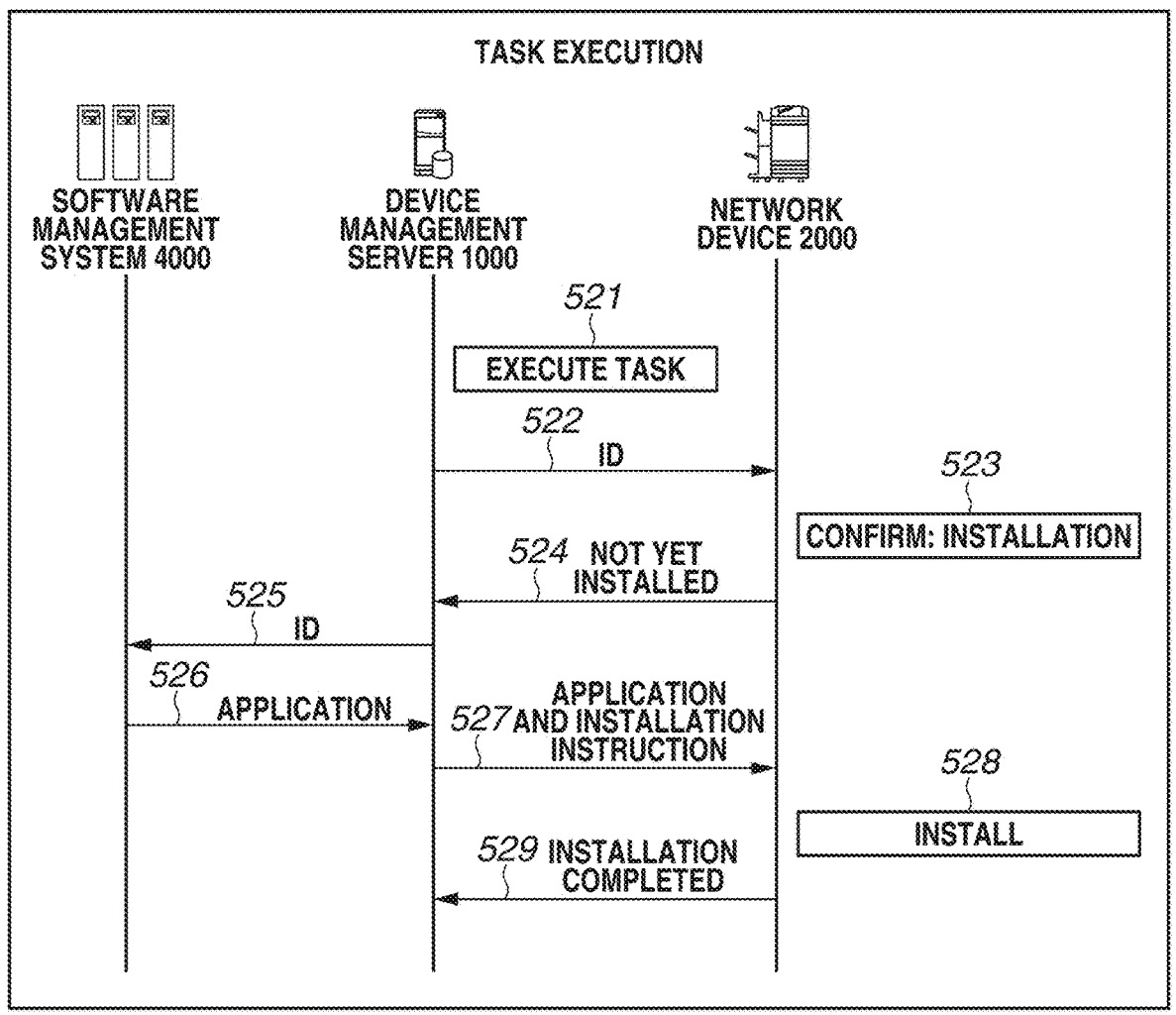

FIGS. 5A and 5B are a sequence for installing a specified application associated with a product key.

First, the software management system 4000 registers an application. At this time, the application and information such as the name, the version, and the identifier (hereinafter referred to as "ID") of the application are registered. For a product of the application, a product key and the application are associated with each other.

A sequence for installing an application from the device management server 1000 is described below.

First, with reference to FIGS. 5A, 6A, 6B, 6C, and 6D, the creation of a template and the creation of a task based on the template are described.

(Creation of Template)

First, a template is created (500). The template corresponds to instructions compiled with contents to be processed in the subsequent execution of a task. Next, the details of the creation of the template are described.

First, a list of applications is acquired (501).

In the step of the acquisition of a list of applications, first, the device management server 1000 transmits a product key to the software management system 4000 (502), then in response to that, acquires the application name, the version, and the ID of an application (503), and displays the application name, the version, and the ID on a UI. If there is a plurality of applications associated with the product key, for example, as illustrated in FIG. 6A, information regarding the plurality of applications is displayed on the UI.

Next, the user selects an application and a version to be installed from among the applications displayed on the UI (504). Then, on a UI (not illustrated), the user selects an operation to be performed on the application (505). The operation is, for example, installation or uninstallation. Then, a template regarding the operation is saved (506).

FIG. 6A illustrates an example of the UI for template creation. In a "template name" field, the name of a template is displayed. In a "product key" field, a product key input by the user is displayed. By pressing an "acquire information" button, applications associated with the product key are displayed in a display window.

(Creation of Task)

A task for the device management server 1000 to perform processing is created (507). In the creation of the task, several items are selected.

First, a template is selected (508). There is also a case where a plurality of templates is created in advance. Thus, a template for installing a desired application is selected (e.g., FIG. 6B).

Next, a device 2000 is selected (509). At this time, a device 2000 on which the application is to be installed is selected (e.g., FIG. 6C). A plurality of devices 2000 can also be selected.

Next, a schedule is selected (510). At this time, the date and time when the task is to be executed or the periodic execution of the task is selected (e.g., FIG. 6D).

Then, the task is saved (511).

(Execution of Task)

Next, with reference to FIG. 5B, a sequence for executing a task is described.

At a scheduled date and time, a task is executed (521).

First, the device management server 1000 transmits the ID of an application to the network device 2000 described in the task (522) and confirms whether the application is already installed on the network device 2000 (523). If the application is not yet installed, the network device 2000 transmits a return value indicating that the application is not yet installed (524). The device management server 1000 transmits the ID of the application to the software management system 4000 (525).

In response to the transmission of the ID, the software management system 4000 distributes the application to the device management server 1000 (526). Receiving the application, the device management server 1000 distributes the application to the network device 2000 and also instructs the network device 2000 to install the application (527). Receiving the instruction, the network device 2000 installs the application (528) and notifies the device management server 1000 that the installation is completed (529). Then, the processing ends.

A first exemplary embodiment is described.

Software Management Processing Flow in Device Management System

FIGS. 7A to 18D are diagrams illustrating a software management processing flow in the device management system characterizing the present disclosure. With reference to FIGS. 7A to 18D, processing flows according to the present disclosure are described.

FIGS. 10 to 16 are flowcharts according to the exemplary embodiments of the present disclosure. The processing illustrated in these flowcharts is performed by the device management server 1000 illustrated in FIG. 1.

Steps in the flowcharts are achieved by the CPU 10 loading a control program from the HDD 19 or the ROM 11 into the RAM 12 and executing the control program.

To set any of the network devices 2000 as a management target in the device management system, a network is searched for the network device 2000. Examples of an algorithm for the search include SNMP. The present disclosure, however, is not limited to this.

Figure 11:
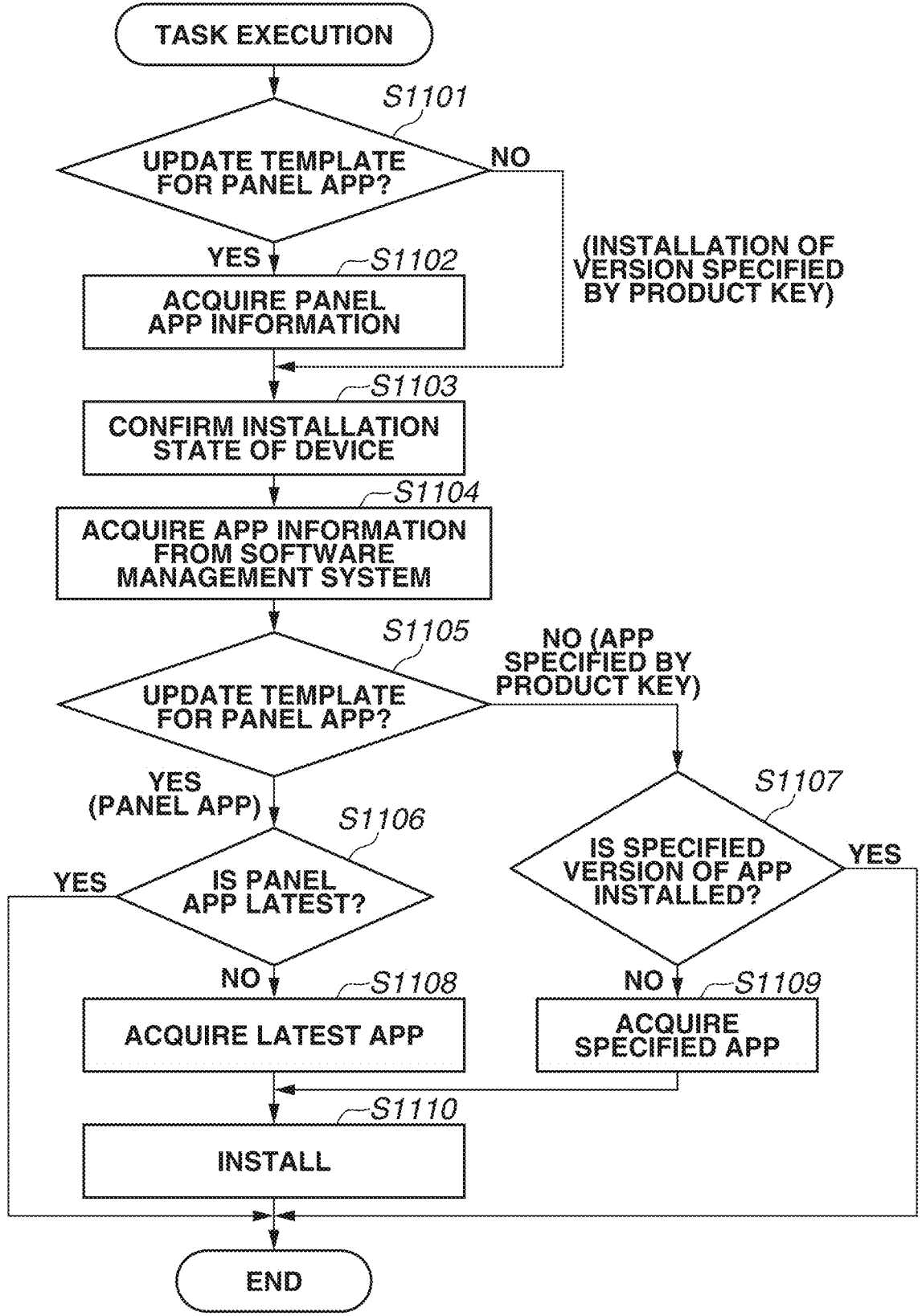
FIG. 11 is a flowchart regarding task execution according to one or more aspect of the present disclosure.

With reference to the flowcharts illustrated in FIGS. 10 and 11, a description is given of an application installation process according to the present disclosure performed by the device management server 1000. This processing is described using an operation case illustrated in FIGS. 7A and 7B. The processing illustrated in FIGS. 10 and 11 is achieved by the CPU 10 executing the device management software.

Installation of Application
(Creation of Template)

When an application is installed, as described above, first, the device management server 1000 creates a template. In the subsequent creation of a task, a template is selected, and the task is executed according to a schedule.

With reference to FIG. 10, a template creation processing flow is described.

First, in step S1001, the template management unit 321 receives through a template creation screen (e.g., FIG. 8) the selection of the input of a "product key" of any application, or an operation instruction regarding a "panel application" from the user via the UI control unit 310. Based on the received selection, the type of an application target is determined.

In step S1002, the template management unit 321 determines whether the operation instruction regarding a "panel application" is selected in step S1001. If the operation instruction regarding a "panel application" is selected (YES in step S1002), the processing proceeds to step S1006. If the input of a "product key" is selected (NO in step S1002), the processing proceeds to step S1003.

In step S1003, the template management unit 321 receives through a template creation screen the input of a product key from the user via the UI control unit 310 and determines a product key for an application to be operated.

In step S1004, the template management unit 321 transmits the input product key to the software management system 4000 and acquires application information including IDs.

In step S1005, based on the application information acquired in step S1004, the template management unit 321 displays application information regarding selectable applications associated with the product key on a template creation screen (FIG. 6A) via the UI control unit 310. Then, the template management unit 321 receives through the template creation screen the input of a selection from the user and determines an application to be operated. Then, the processing proceeds to step S1006.

In step S1006, the template management unit 321 holds the selected state of an operation such as installation selected by the user via the UI control unit 310.

Finally, a template is saved.

Then, similarly to the conventional sequence for installing an application (FIGS. 5A and 5B), a task is created, and a task is executed at a scheduled date and time.

(Execution of Task)

With reference to FIG. 11, a task execution processing flow is described.

In step S1101, the installation management unit 36 determines whether a template acquired from the template data storage unit 322 is an update template for a panel application. If a task using an update template for a panel application is to be executed (YES in step S1101), the processing proceeds to step S1102. If a version specified by a product key is to be installed (NO in step S1101), the processing proceeds to step S1103.

In step S1102, the installation management unit 36 transmits a request to acquire panel application information to the software management system 4000, and in response to the request, acquires panel application information.

In step S1103, the installation management unit 36 transmits to the network device 2000 the ID of a panel application that corresponds to the information acquired in step S1102. Then, the installation management unit 36 acquires panel application information regarding the panel application installed on the network device 2000.

If it is determined in step S1101 that the template is not an update template for a panel application (NO in step S1101), the installation management unit 36 transmits the ID of a specified application and acquires specified application information regarding the specified application installed on the network device 2000.

In step S1104, the installation management unit 36 transmits to the software management system 4000 the ID of the panel application actually installed on the network device 2000 that is acquired in step S1103. Then, the installation management unit 36 acquires panel application information regarding the installed panel application. This panel application information also includes version information regarding the application.

If it is determined in step S1101 that the template is not an update template for a panel application (NO in step S1101), the installation management unit 36 acquires information regarding the specified application.

In step S1105, the installation management unit 36 determines whether the template acquired from the template data storage unit 322 is an update template for a panel application. If a task using an update template for a panel application is to be executed (YES in step S1105), the processing proceeds to step S1106. If a version specified by a product key is to be installed (NO in step S1105), the processing proceeds to step S1107.

Case of Update of Panel Application #

In this case, the installation information regarding the network device 2000 is already acquired in step S1103, and the application information is already acquired in step S1104.

In step S1106, based on these acquired pieces of information, the installation management unit 36 determines whether the latest panel application is installed on the network device 2000. If the latest version is installed (YES in step S1106), the installation management unit 36 indicates on a UI via the UI control unit 310 that the latest version is installed. Then, this processing ends. If, on the other hand, it is determined that the latest version is not installed (NO in step S1106), the processing proceeds to step S1108.

In step S1108, the installation management unit 36 transmits the ID of the latest panel application acquired in step S1104 to the software management system 4000, acquires the panel application, and saves the panel application in the application data storage unit 38. Then, the processing proceeds to step S1110.

Case of Update of Application Specified by Product Key #

In step S1107, based on the installation information acquired in step S1103 and the application information acquired in step S1104, the installation management unit 36 determines whether the specified version of the application is installed on the network device 2000. If the specified version of the application is installed (YES in step S1107), the installation management unit 36 indicates on a UI via the UI control unit 310 that the specified version of the application is installed. Then, this processing ends. If the specified version of the application is not installed (NO in step S1107), the processing proceeds to step S1109.

In step S1109, the installation management unit 36 transmits the ID of the specified application acquired in step S1104 to the software management system 4000, acquires the application, and saves the application in the application data storage unit 38. Then, the processing proceeds to step S1110.

In step S1110, using the application acquired in step S1108 or S1109 and a license file acquired by the license management unit 37, the installation management unit 36 instructs the network device 2000 to install the application.

Based on this series of operations, when a template is created, the option of installing the latest version of a panel application is provided. Then, when a task is executed, it is possible to install the latest version of an application that can be acquired.

Figure 7B:
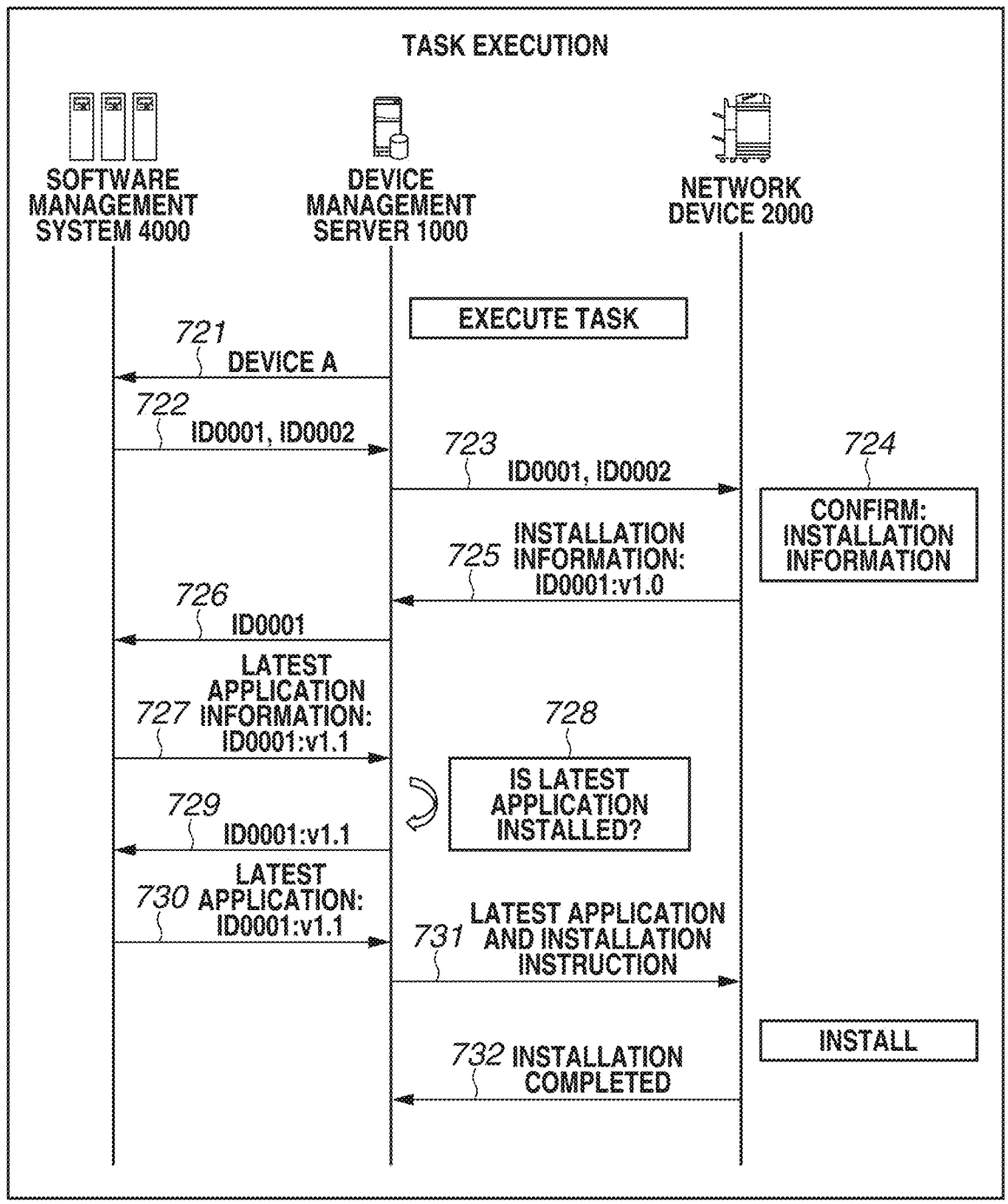

With reference to the flowcharts in FIGS. 10 and 11 and sequence diagrams in FIGS. 7A and 7B, a supplementary description is given of the operation of installing the update of the panel application in the above processing flow.

FIGS. 7A and 7B are examples where the sequence for installing an application in FIGS. 5A and 5B is illustrated according to the present exemplary embodiment.

When a template for an application is created, then in step S1001, the UI illustrated in FIG. 8 is displayed (on a display unit), and an application specified by a product key or an operation regarding a panel application can be selected (701). In the example of FIG. 8, a panel application is selected in step S1002. Thus, the processing proceeds to step S1006.

In step S1006, an operation is selected (702). An operation such as installation or uninstallation can be selected. In this case, installation is selected as the operation, and a template is saved. Then, using the template, as illustrated in FIGS. 6B, 6C, and 6D, a device 2000 and a schedule are selected, and a task is created.

At the scheduled date and time, the device management server 1000 executes this task. In steps S1101 and S1102 in FIG. 11, the device management server 1000 communicates with the software management system 4000, thereby acquiring information regarding panel applications (e.g., ID0001 and ID0002) that can be installed on the network device 2000 (721 and 722). In steps S1103 to S1106, the device management server 1000 confirms the installation state of the network device 2000, acquires panel application information regarding an installed panel application, and confirms whether the latest version is installed (723 to 728). At this time, ID0001:v1.0 is installed on the network device 2000, and the acquired latest version is ID0001:v1.1. In this case, it is determined that the latest version is not installed (NO in step S1106). In step S1108, the latest version of the application is acquired (729 and 730). In step S1110, an instruction to install the application is given, and the application is installed (731 and 732).

Consequently, when a task is executed, it is possible to install the latest version of a panel application installed on the network device 2000.

In the first exemplary embodiment, in the creation of a task, the user sets an execution schedule for the task. In a second exemplary embodiment, when a task is created for which a template for installing a panel application is specified, a periodic task is automatically set to a schedule. Then, the task is set as the periodic task, whereby it is possible to always maintain the application in the state of the latest version.

Figure 12:
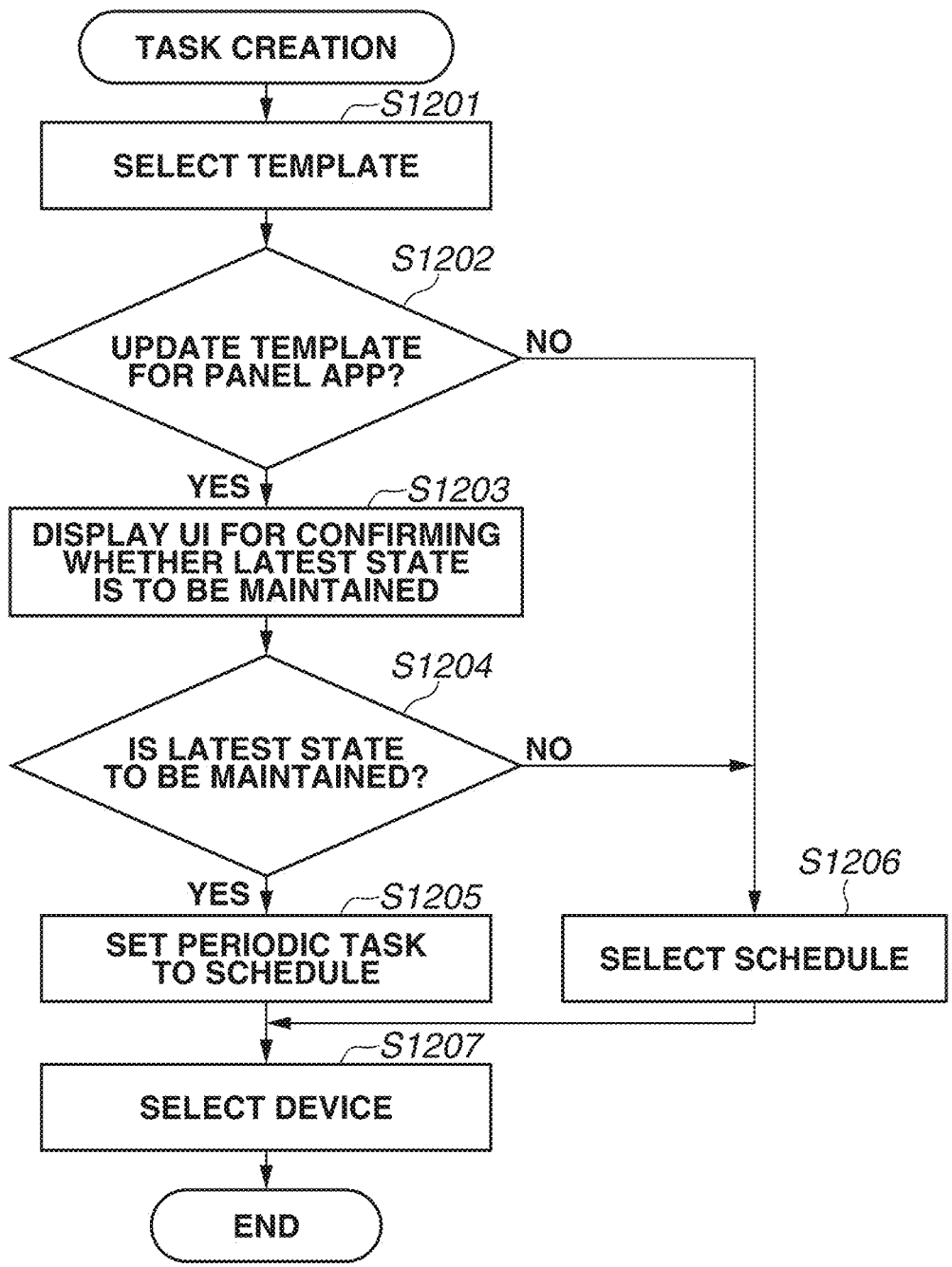
FIG. 12 is a flowchart regarding task creation according to one or more aspect of the present disclosure.

With reference to a flowchart in FIG. 12 together with examples of UIs in FIGS. 9A and 9B, a processing flow according to the second exemplary embodiment is described below. The processing illustrated in FIG. 12 is achieved by the CPU 10 executing the device management software.

(Creation of Task)

In step S1201, the task management unit 33 receives the selection of a template made on a template selection screen by the user via the UI control unit 310.

In step S1202, the task management unit 33 determines whether the template selected in step S1201 is an update template for a panel application. If it is determined that the template is an update template for a panel application (YES in step S1202), the processing proceeds to step S1203. If not (NO in step S1202), the processing proceeds to step S1206.

In step S1203, the task management unit 33 displays via the UI control unit 310 a confirmation UI (e.g., FIG. 9A) for confirming whether the latest state is to be maintained.

In step S1204, the task management unit 33 determines via the UI control unit 310 whether a selection is made to maintain the state of the latest version on the UI displayed in step S1203. If it is determined that the latest state is to be maintained (e.g., "Yes (Y)" is pressed on the UI in FIG. 9A) (YES in step S1204), the processing proceeds to step S1205. If not (NO in step S1204), the processing proceeds to step S1206.

In step S1205, to periodically execute a task, the task management unit 33 displays via the UI control unit 310 a schedule setting UI and urges the user to input the periodic execution of the task (e.g., FIG. 9B). This example illustrates a schedule setting for performing this task at 00 o'clock on the first of each month. At this time, the user may not be allowed to select settings other than the periodic task. In this case, the schedule intervals are monthly. Alternatively, these intervals can also be changed based on a setting file, or previously set schedule intervals can also be held. Since the schedule is automatically set, it is also possible not to display the schedule setting. Then, the periodic task is set to the schedule, and the processing proceeds to step S1207.

On the other hand, if it is determined in step S1204 that the latest version is not to be maintained (NO in step S1204), and if it is determined in step S1202 that the template is not an update template for a panel app (NO in step S1202), the processing proceeds to step S1206.

In step S1206, the task management unit 33 displays a schedule selection screen via the UI control unit 310 and requests the user to input a schedule (e.g., FIG. 6D). The task management unit 33 determines the schedule input by the user, and the processing proceeds to step S1207.

In step S1207, the task management unit 33 displays a device selection screen (e.g., FIG. 6C) via the UI control unit 310 and urges the user to provide an input, thereby selecting and determining a device 2000 with which to execute the task. Then, the task is saved.

Based on this series of operations, in the creation of a task, if it is determined that a template is to install a panel application, it is possible to automatically set a periodic task to the schedule and always maintain the panel application in the state of the latest version.

In the above example, the UI illustrated in FIG. 9A is displayed. Alternatively, without making this confirmation, it is also possible to allow the user to make a selection when the operation of the template is confirmed. Yet alternatively, it is also possible to only determine whether the template is an update template for a panel application, and then set the periodic task to the schedule.

In the first and second exemplary embodiments, all installable panel applications registered in the software management system 4000 for each device 2000 are set as targets of update installation. In a third exemplary embodiment, when a template is created, a panel application as an update target can be selected.

With reference to a flowchart illustrated in FIG. 13, a sequence diagram in FIG. 17, and examples of UIs in FIGS. 18A, 18B, 18C, and 18D, a description is given below.

Figure 13:
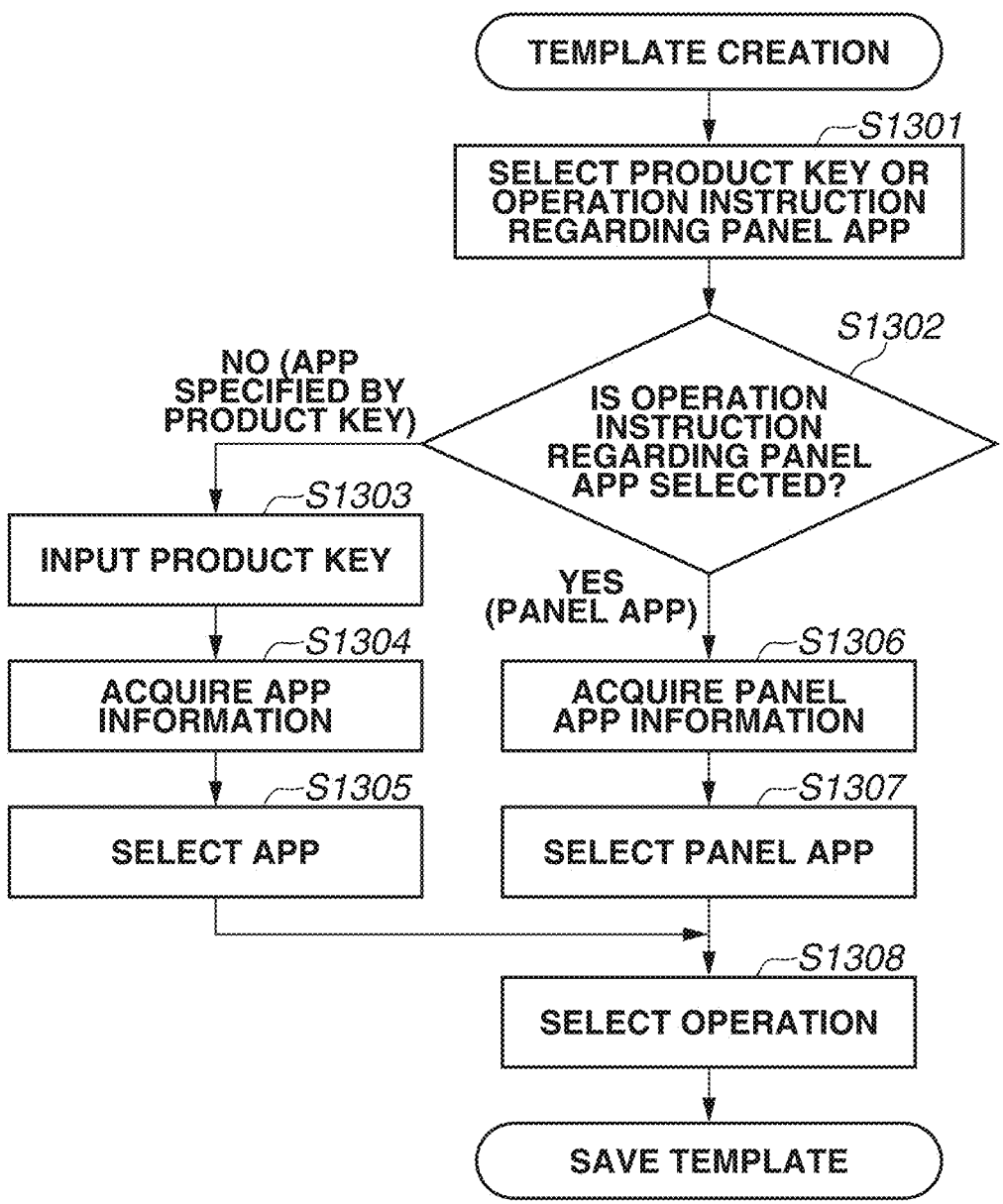
FIG. 13 is a flowchart regarding template creation according to one or more aspect of the present disclosure.

The processing illustrated in FIG. 13 is achieved by the CPU 10 executing the device management software.

The flow of the entire processing is similar to that in the first exemplary embodiment. First, a template is created. In the subsequent creation of a task, a template is selected, a schedule is set, and the task is saved. Then, the task is executed according to the schedule.

(Creation of Template)

In step S1301, the template management unit 321 receives through a template creation screen (e.g., FIG. 8) the selection of the input of a product key of any application, or an operation instruction regarding a panel application from the user via the UI control unit 310. Based on the received selection, the type of an application is determined.

In step S1302, the template management unit 321 determines whether the operation instruction regarding a panel application is selected in step S1301. If the operation instruction regarding a panel application is selected (YES in step S1302), the processing proceeds to step S1306. If the input of a product key is selected (NO in step S1302), the processing proceeds to step S1303.

In step S1303, the template management unit 321 receives through a template creation screen the input of a product key from the user via the UI control unit 310 and determines a product key for an application as an update target.

In step S1304, the template management unit 321 transmits the input product key to the software management system 4000 and acquires application information including IDs.

In step S1305, based on the information acquired in step S1304, the template management unit 321 displays application information regarding selectable applications associated with the product key. Then, the template management unit 321 receives through the template creation screen the input of the selection of an application as an update target from the user via the UI control unit 310 and determines the application as the update target.

If, on the other hand, the operation instruction regarding a panel application is selected (YES in step S1302), then in step S1306, the template management unit 321 transmits an instruction to acquire panel application information to the software management system 4000 and acquires application information including IDs.

In step S1307, based on the information acquired in step S1306, the template management unit 321 displays panel application information regarding selectable panel applications as a list on a UI unit. Then, the template management unit 321 receives through a template creation screen (e.g., FIG. 18A) the input of the selection of an application as an update target from the user via the UI control unit 310 and determines the application as the target.

In step S1308, according to the selection of the user via the UI control unit 310, the template management unit 321 holds the selected state of an operation such as the update installation of the application as the target.

Then, a template is saved. Then, in the creation of a task and the execution of the task illustrated in FIGS. 5A and 5B, the selected panel application is updated.

Figure 17:
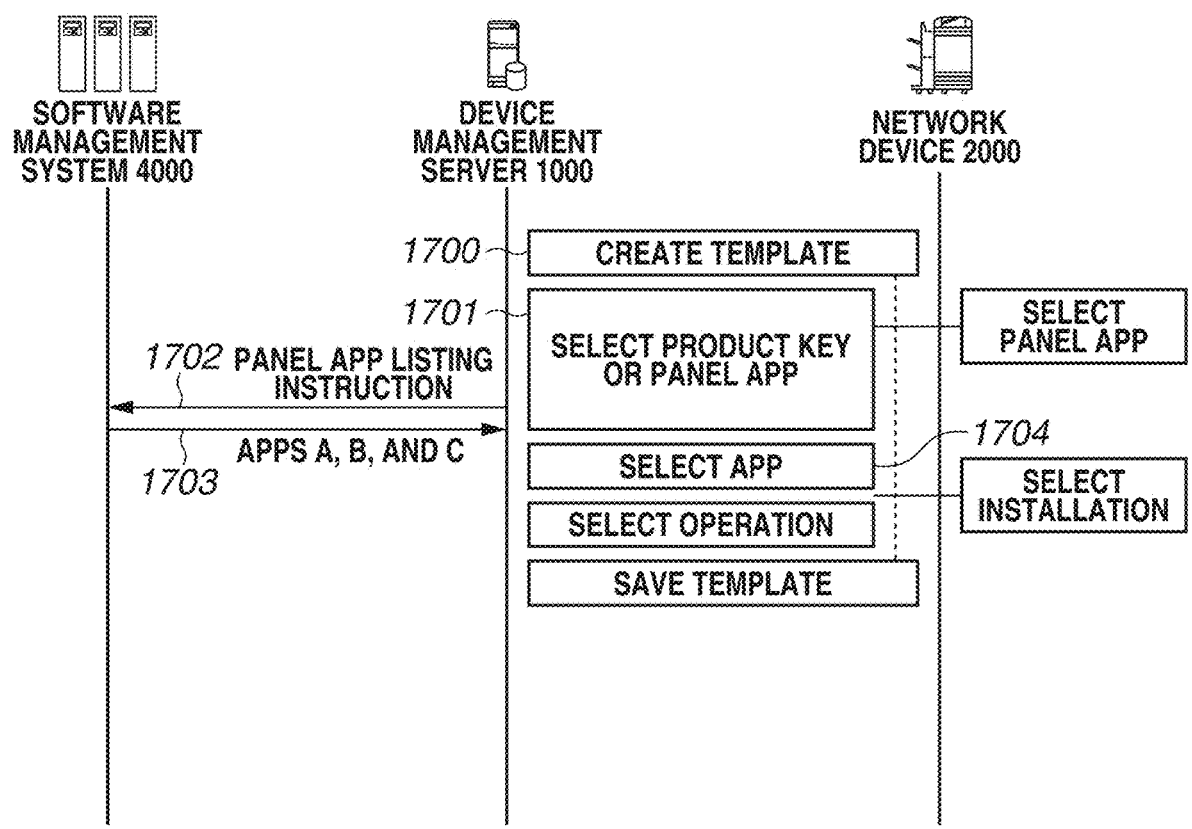
FIG. 17 is a sequence diagram regarding installation of an application according to one or more aspect of the present disclosure.

With reference to the sequence diagram in FIG. 17 and the UI screens in FIGS. 18A, 18B, 18C, and 18D, a supplementary description is given of this processing.

When a template for an application is created, then in step S1301, the UI illustrated in FIG. 8 is displayed, and an application specified by a product key or an operation regarding a panel application can be selected (1701). In this case, a panel application is selected in step S1302. Then, the processing proceeds to step S1306.

In step S1306, an instruction to list panel applications is transmitted to the software management system 4000 (1702), and application names and IDs are acquired.

In step S1307, the process of displaying the application names and the IDs on a UI is performed. In this case, information regarding applications A, B, and C is transmitted from the software management system 4000 to the device management server 1000 (1703) and displayed on the UI. FIG. 18A illustrates an example of this state. The user selects an application to be updated among the applications A, B, and C (1704). Next, similarly to the sequence in FIGS. 5A and 5B, an operation is selected, and a template is saved. For example, as illustrated in FIG. 18A, an update template for the applications B and C is created.

Then, based on a sequence similar to that illustrated in FIGS. 5A and 5B, a task is created, and the task is executed. Then, the selected panel applications B and C are updated.

In the third exemplary embodiment, an example has been described where all installed applications as update targets are individually selected. In a fourth exemplary embodiment, the user is allowed to select the type of a panel application as a target, thereby improving the convenience of application management for the user. With reference to a flowchart illustrated in FIG. 14, this processing is described. With reference to a sequence diagram in FIG. 19 and the examples of the UIs in FIGS. 18A, 18B, 18C, and 18D, a supplementary description is given of this processing.

Figure 14:
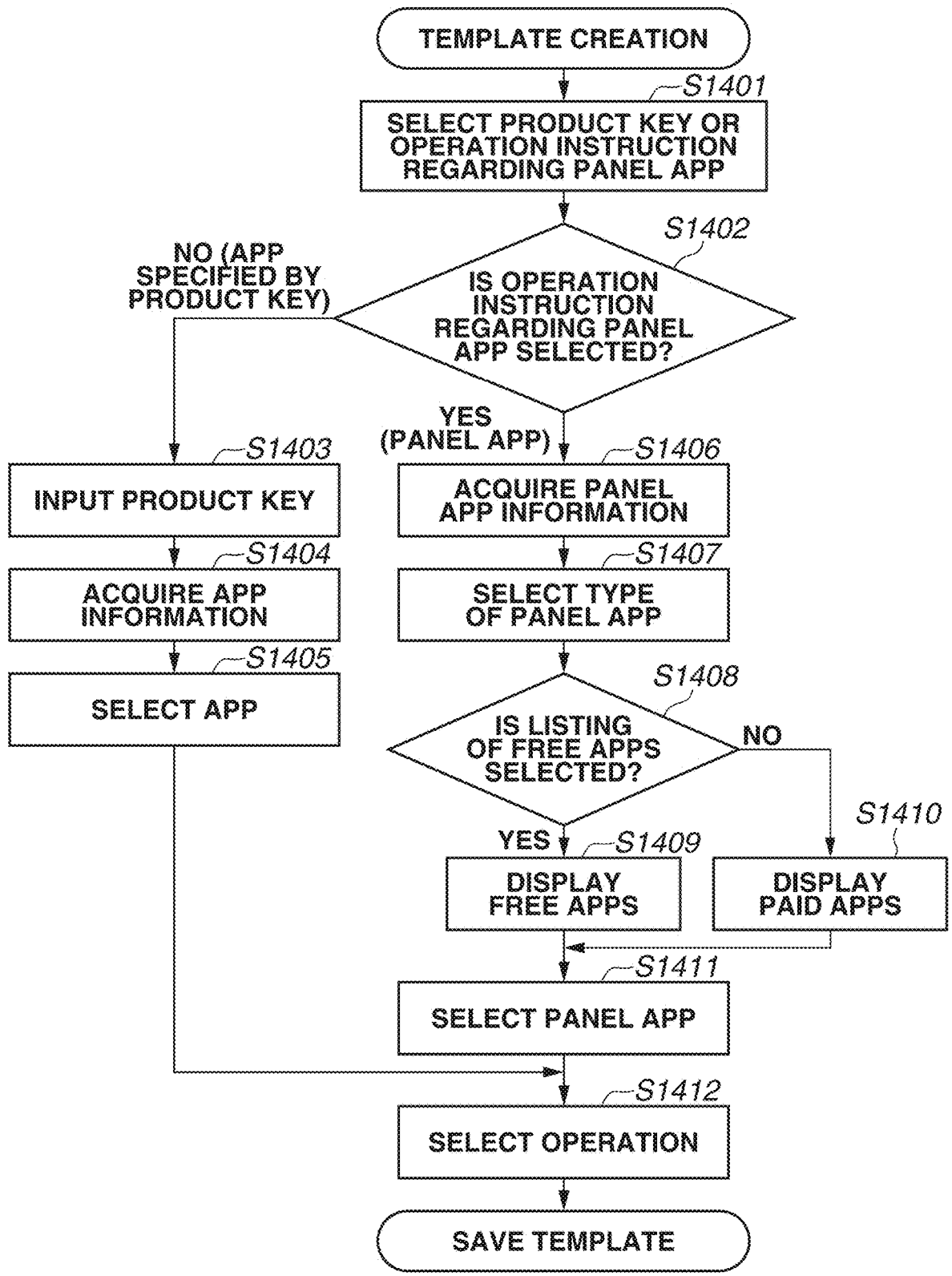
FIG. 14 is a flowchart regarding template creation according to one or more aspect of the present disclosure.

Similarly to the first exemplary embodiment, the processing illustrated in FIG. 14 is achieved by the CPU 10 executing the device management software.

Similarly to the third exemplary embodiment, first, a template is created. Then, in the subsequent creation of a task, a template is selected, and the task is executed according to a schedule.

(Creation of Template)

In step S1401, the template management unit 321 receives through a template creation screen the selection of the input of a product key of any application, or an operation instruction regarding the update installation of a panel application from the user and determines the type of an application.

In step S1402, the template management unit 321 determines whether the operation instruction regarding a panel application is selected in step S1401. If the operation instruction regarding a panel application is selected (YES in step S1402), the processing proceeds to step S1406. If the input of a product key is selected (NO in step S1402), the processing proceeds to step S1403.

Case Where Application Specified by Product Key is Selected #

In step S1403, the template management unit 321 receives through a template creation screen the input of a product key from the user via the UI control unit 310 and determines a product key for an application to be operated.

In step S1404, the template management unit 321 transmits the input product key to the software management system 4000 and acquires application information including IDs.

In step S1405, based on the information acquired in step S1404, the template management unit 321 displays application information regarding selectable applications associated with the product key. Subsequently, the template management unit 321 receives through the template creation screen the input of a selection from the user via the UI control unit 310 and determines an application to be operated. Then, the processing proceeds to step S1412.

Case Where Panel Application Is Selected #

In step S1406, the template management unit 321 transmits an instruction to acquire panel application information to the software management system 4000 and acquires application information including IDs.

In step S1407, the template management unit 321 receives through a template creation screen (e.g., FIG. 18B) the selection of the type of a panel application from the user via the UI control unit 310 and determines the type of the application. In this case, the type of the application is a free or paid application.

In step S1408, the template management unit 321 determines whether the application type is the free application or the paid application. If the free application is selected (Yes in step S1408), the processing proceeds to step S1409. If the paid application is selected (No in step S1408), the processing proceeds to step S1410.

In step S1409, the template management unit 321 displays free applications based on the panel application information acquired in step S1406 via the UI control unit 310 and performs a selection process.

In step S1410, the template management unit 321 displays paid applications based on the panel application information acquired in step S1406 via the UI control unit 310 and performs a selection process.

In step S1411, the template management unit 321 receives through a template creation screen (FIG. 18C) the input of a selection among the panel applications displayed in step S1409 or S1410 from the user via the UI control unit 310 and determines an application. Then, the processing proceeds to step S1412.

In step S1412, according to the selection of the user via the UI control unit 310, the template management unit 321 holds the selected state of an operation such as installation. Then, a template is saved. Then, in the creation of a task and the execution of the task illustrated in FIGS. 5A and 5B, the selected panel application is updated.

Figure 19:
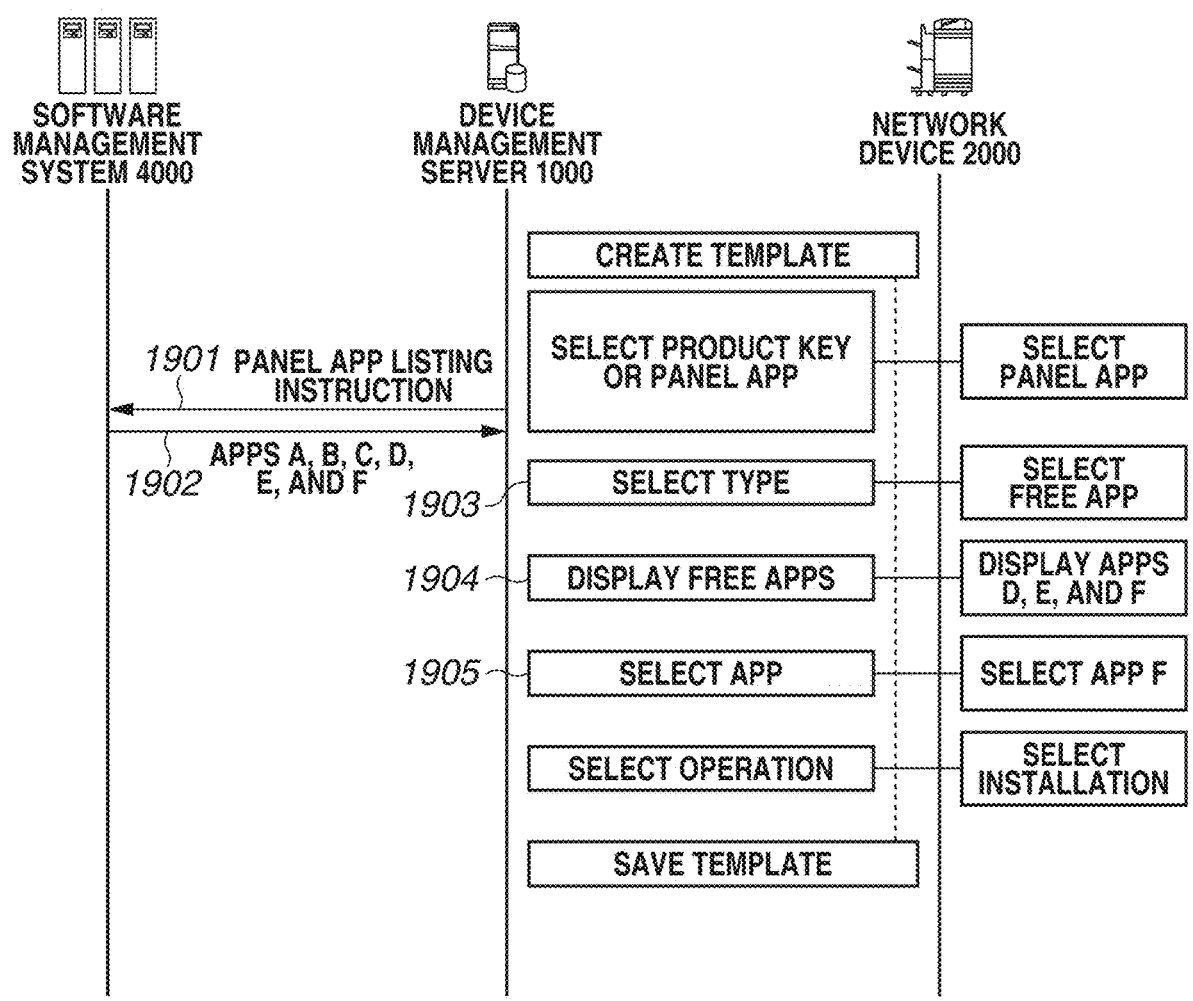
FIG. 19 is a sequence diagram regarding installation of another application.

With reference to the sequence diagram in FIG. 19 and the examples of the UIs in FIGS. 18A, 18B, 18C, and 18D, a supplementary description is given of this processing.

Based on a sequence similar to that in the third exemplary embodiment and in steps S1401, S1402, and S1406, an instruction to acquire panel application information is transmitted to the software management system 4000 (1901), and application information including application names, IDs, and app types is acquired. In this case, information regarding applications A, B, C, D, E, and F is transmitted (1902). In step S1407, a UI illustrated in FIG. 18B is displayed, and the listing of free applications or paid applications can be selected (1903). In this case, in S1408, the free application is selected, and the processing proceeds to step S1409. In step S1409, free applications are selected based on the application information acquired in step S1406, and the applications D, E, and F are displayed (1904) (e.g., FIG. 18C). The user selects an application among the applications D, E, and F (1905). In this case, the free application F is selected. Then, similarly to the sequence in FIGS. 5A and 5B, an operation, e.g., installation in this case, is selected, and a template is saved. Then, an update template for the application F is created.

Then, based on a sequence similar to that illustrated in FIGS. 5A and 5B, a task is created, and the task is executed. Then, the panel application F selected by the user is updated.

In the present exemplary embodiment, as the type of the application, the free application or the paid application is selected. Alternatively, the type of the application can be categorized based on various criteria such as distinction according to the release year and types according to functions to be used.

In the first exemplary embodiment, an example has been described where a panel application to be updated is installed on the device 2000 via the device management server 1000. In a fifth exemplary embodiment, a description is given of a method in which the device 2000 directly accesses the software management system 4000 and installs an update. At this time, the timing of the installation is transmitted to the network device 2000, and the installation is enabled at a timing desired by the user, thereby further improving the convenience for the user. With reference to flowcharts illustrated in FIGS. 15 and 16, this processing is described. With reference to a sequence diagram in FIG. 20 and the examples of the UIs in FIGS. 18A, 18B, 18C, and 18D, a supplementary description is given of this processing.

Figure 15:
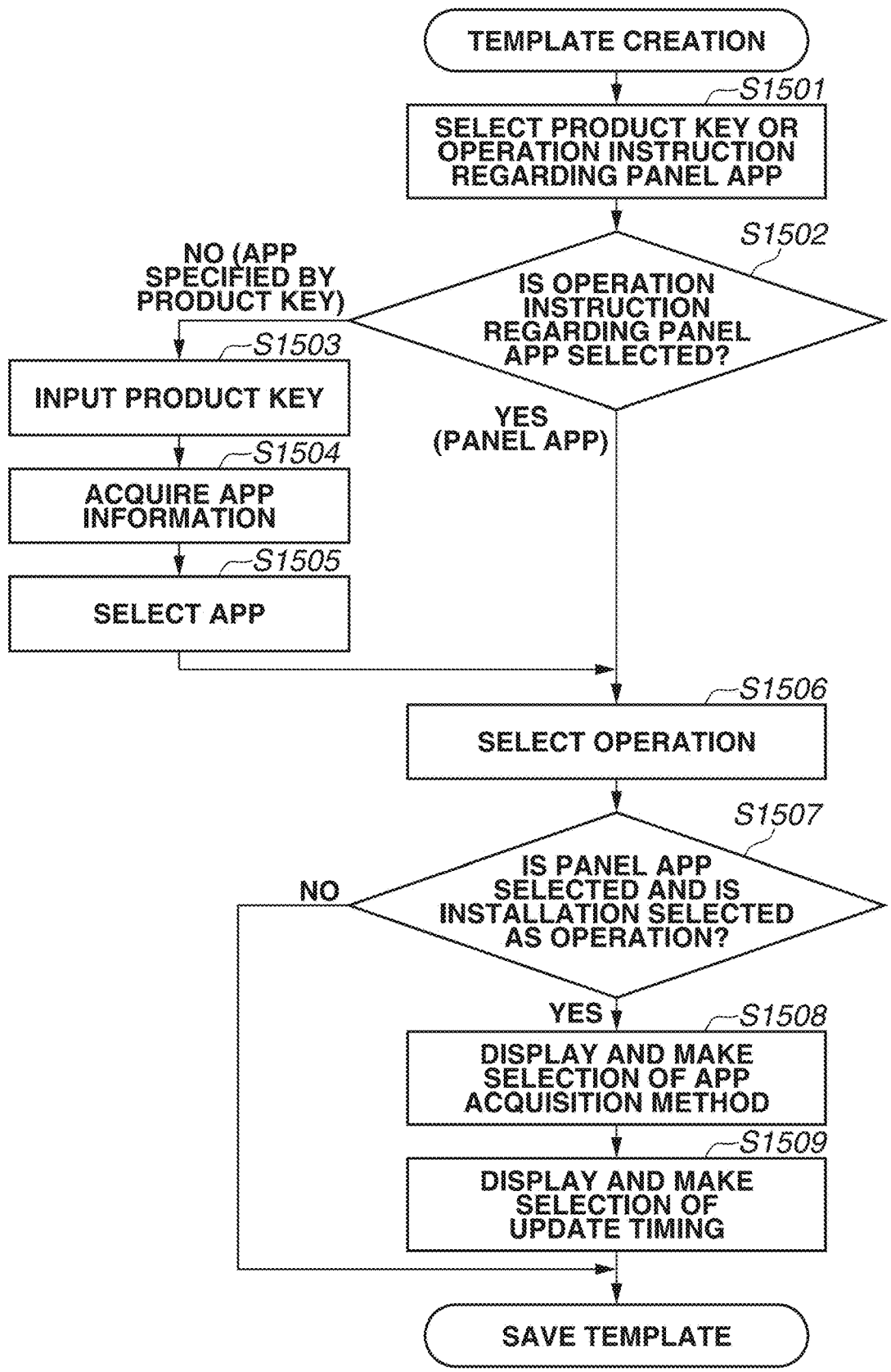
FIG. 15 is a flowchart regarding template creation according to one or more aspect of the present disclosure.
Figure 16:
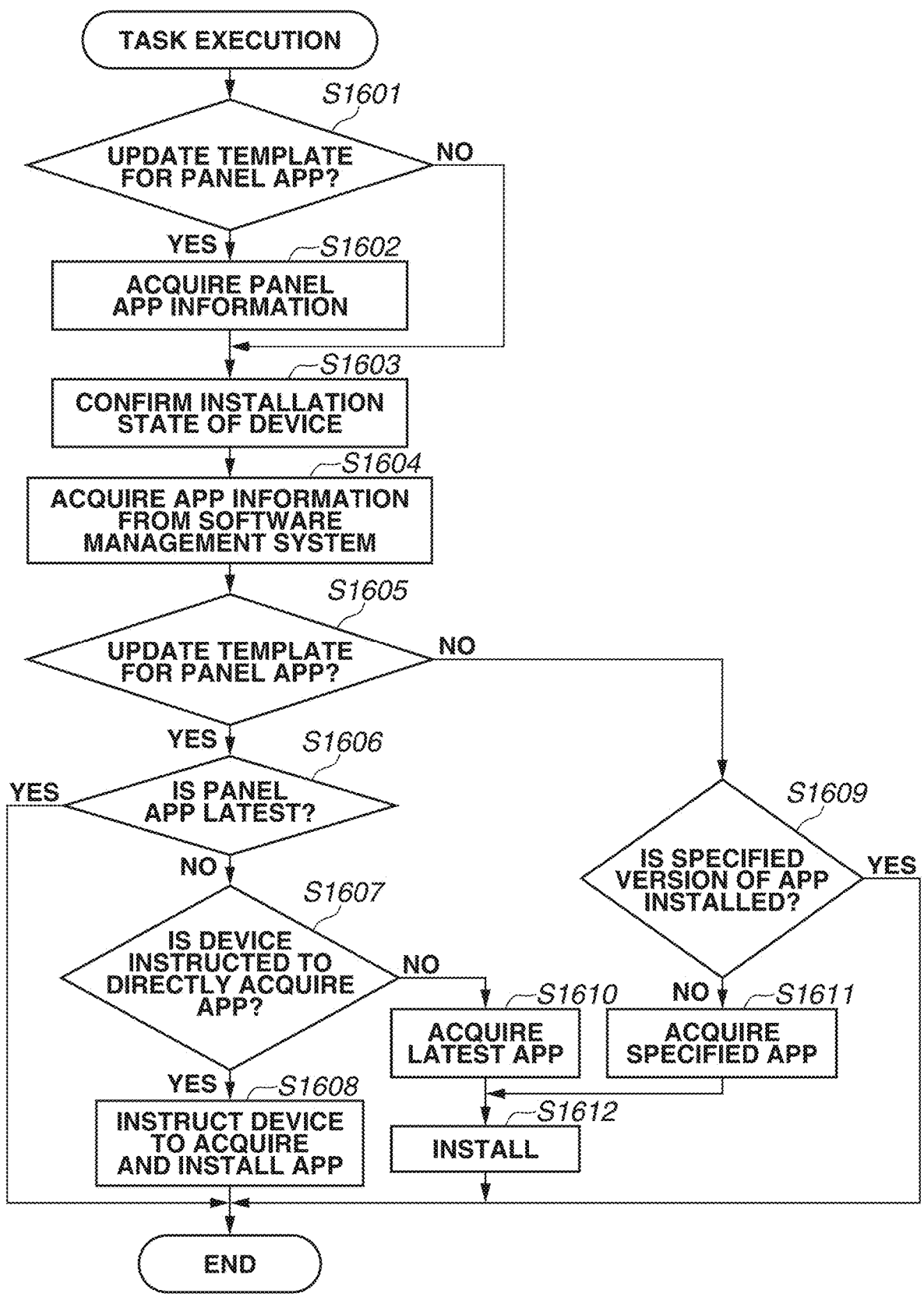
FIG. 16 is a flowchart regarding task execution according to one or more aspect of the present disclosure.

Similarly to the first exemplary embodiment, the processing illustrated in FIGS. 15 and 16 is achieved by the CPU 10 executing the device management software.

Similarly to the first exemplary embodiment, when an application is installed, as described above, first, the device management server 1000 creates a template. In the subsequent creation of a task, a template is selected, and the task is executed according to a schedule.

(Creation of Template)

With reference to FIG. 15, a template creation processing flow is described.

In step S1501, the template management unit 321 receives through a template creation screen the selection of the input of a product key of any application, or an operation instruction such as the update installation of a panel application from the user and determines the type of an application.

In step S1502, the template management unit 321 determines whether the operation instruction regarding a panel application is selected in step S1501. If the operation instruction regarding a panel application is selected (YES in step S1502), the processing proceeds to step S1506. If the input of a product key is selected (NO in step S1502), the processing proceeds to step S1503.

Case Where Application Specified by Product Key Is Selected #

In step S1503, the template management unit 321 receives through a template creation screen the input of a product key from the user via the UI control unit 310 and determines a product key for an application to be operated.

In step S1504, the template management unit 321 transmits the input product key to the software management system 4000 and acquires application information including IDs.

In step S1505, based on the information acquired in step S1504, the template management unit 321 displays application information regarding selectable applications associated with the product key. Subsequently, the template management unit 321 receives through the template creation screen the input of a selection from the user via the UI control unit 310 and determines an application to be operated. Then, the processing proceeds to step S1506.

In step S1506, the template management unit 321 holds the selected state of an operation such as update installation according to the selection of the user via the UI control unit 310.

In step S1507, the template management unit 321 determines whether a panel application is selected in step S1501, and installation is selected in the selection of the operation in step S1506. If a panel application and installation are selected (YES in step S1507), the processing proceeds to step S1508. If a panel application and installation are not selected (NO in step S1507), the template management unit 321 saves a template. Then, the processing ends.

In step S1508, the template management unit 321 receives through a template creation screen (e.g., FIG. 18D) an application acquisition method from the user via the UI control unit 310 and determines the method for acquiring the application to be installed.

In step S1509, the template management unit 321 receives through the template creation screen (e.g., FIG. 18D) an application update timing from the user via the UI control unit 310 and determines the update timing of the application to be installed.

Then, a template is saved, and the processing ends.

Then, similarly to the first exemplary embodiment regarding an application, a task is created, and a task is executed at a scheduled date and time.

(Execution of Task)

In step S1601, the installation management unit 36 determines whether a template acquired from the template data storage unit 322 is an update template for a panel application. If a task using an update template for a panel application is to be executed (YES in step S1601), the processing proceeds to step S1602. If a version specified by a product key is to be installed (NO in step S1601), the processing proceeds to step S1603.

In step S1602, the installation management unit 36 transmits a request to acquire panel application information to the software management system 4000 and acquires panel application information.

In step S1603, the installation management unit 36 transmits to the network device 2000 the ID of a panel application that is the information acquired in step S1602. Then, the installation management unit 36 acquires panel application information regarding the panel application installed on the network device 2000. This panel application information also includes version information.

If it is determined in step S1601 that a version specified by a product key is to be installed (NO in step S1601), the installation management unit 36 transmits the ID of a specified application and acquires specified application information regarding the specified application installed on the device 2000.

In step S1604, the installation management unit 36 transmits to the software management system 4000 the ID of the panel application actually installed on the device 2000 that is acquired in step S1603. Then, the installation management unit 36 acquires application information regarding the installed panel application. If it is determined in step S1601 that the template is not an update template for a panel application (NO in step S1601), the installation management unit 36 acquires information regarding the specified application.

In step S1605, the installation management unit 36 determines whether the template acquired from the template data storage unit 322 is an update template for a panel application. If a task using an update template for a panel application is to be executed (YES in step S1605), the processing proceeds to step S1606. If an update to a version specified by a product key is to be installed (NO in step S1605), the processing proceeds to step S1609.

In step S1606, based on the installation information regarding the device 2000 acquired in step S1603 and the application information acquired in step S1604, the installation management unit 36 determines whether the latest panel application is installed on the device 2000. If the latest version is installed (YES in step S1606), the installation management unit 36 indicates via the UI control unit 310 that the latest version is installed. Then, the flow ends. If the latest version is not installed (NO in step S1606), the processing proceeds to step S1607.

In step S1607, the installation management unit 36 determines whether the template acquired from the template data storage unit 322 is set such that the device 2000 directly acquires the application from the software management system 4000. If a task using the thus set template is to be executed (YES in step S1607), the processing proceeds to step S1608. If the application is to be acquired via the device management server 1000 (NO in step S1607), the processing proceeds to step S1610.

In step S1608, the installation management unit 36 transmits to the network device 2000 the ID of the panel application, access information regarding access to the software management system 4000, and an update instruction including the update timing that are the information acquired in step S1602. Then, the flow ends.

In step S1610, the installation management unit 36 transmits the ID of the latest panel application acquired in step S1604 to the software management system 4000, acquires the panel application, and saves the panel application in the application data storage unit 38. Then, the processing proceeds to step S1612.

The installation information regarding the network device 2000 is already acquired in step S1603, and the application information is already acquired in step S1604.

In step S1609, based on these acquired pieces of information, the installation management unit 36 determines whether the specified version of the application is installed on the network device 2000. If the specified version of the application is installed (YES in step S1609), the installation management unit 36 indicates via the UI control unit 310 that the specified version of the application is installed. Then, the processing ends. If the specified version of the application is not installed (NO in step S1609), the processing proceeds to step S1611.

In step S1611, the installation management unit 36 transmits the ID of the specified version of the application acquired in step S1604 to the software management system 4000, acquires the application, and saves the application in the application data storage unit 38. Then, the processing proceeds to step S1612.

In step S1612, using the application acquired in step S1610 or S1611 and a license file acquired by the license management unit 37, the installation management unit 36 instructs the network device 2000 to install the application. Then, the flow ends.

In step S1608, the information acquired in step S1602 (the ID of the panel application, the access information regarding access to the software management system 4000, and the update instruction including the update timing) is transmitted to the network device 2000. In this case, then, at the specified update timing, the network device 2000 acquires the application from the software management system 4000 and installs the application using the application installer 44.

Based on this series of operations, options for an acquisition method and an acquisition timing in a device are provided, and if direct acquisition from the device is selected as an acquisition method specified when a task is executed, it is possible to install an application at a specified acquisition timing.

With reference to the sequence diagram in FIG. 20 and the examples of the UIs in FIGS. 18A, 18B, 18C, and 18D, a supplementary description is given of the processing flow described with reference to FIGS. 15 and 16.

Figure 20:
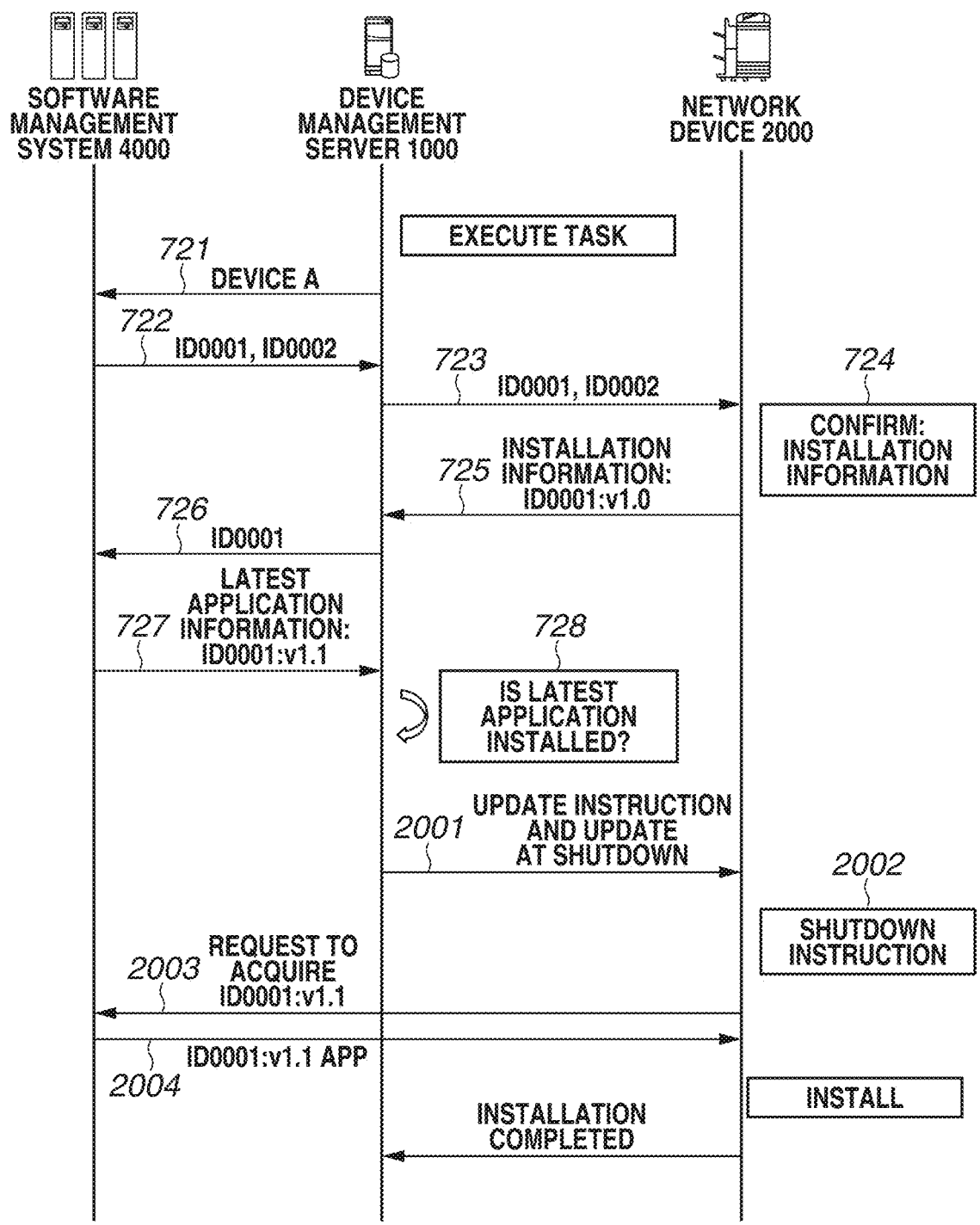
FIG. 20 is a sequence diagram regarding installation of yet another application.

FIG. 20 is an example where the sequence for installing an application in FIGS. 5A and 5B is illustrated according to the present exemplary embodiment.

Based on a sequence similar to that in the first exemplary embodiment, in step S1501, the UI illustrated in FIG. 8 is displayed. In step S1502, a panel application is selected. Then, the processing proceeds to step S1506.

In step S1506, an operation is selected. In this case, installation is selected as the operation. Next, in step S1508, an acquisition method is selected. The UI illustrated in FIG. 18D is displayed, and the acquisition of the application "via device management server" or the acquisition of the application "directly from device" can be selected. In this case, "directly from device" is selected, and the processing proceeds to step S1509.

In step S1509, as in the UI illustrated in FIG. 18D, as an acquisition timing, "immediately", "specify from panel", or "at shutdown" can be selected. In this case, "at shutdown" is selected, and a template is saved.

Then, using the template, as illustrated in FIGS. 6C and 6D, a device 2000 and a schedule are selected, and a task is created.

At the scheduled date and time, this task is executed. Based on a sequence similar to that in the first exemplary embodiment, in steps S1601 and S1602, information regarding panel applications (e.g., ID0001 and ID0002) that can be installed on the device 2000 is acquired (721 and 722). Subsequently, in step S1606, the installation state of the device 2000 is confirmed, panel application information regarding an installed panel application is acquired, and it is confirmed whether the latest version is installed (723 and 724). At this time, ID0001:v1.0 is installed on the network device 2000 (725), and the acquired latest version is ID0001: v1.1. In this case, it is determined that the latest version is not installed (NO in step S1606) (728). In step S1607, an acquisition method is determined (726 and 727). At this time, as set above on the UI, it is determined that the application is to be acquired directly from the network device 2000. In step S1608, the network device 2000 is instructed to install the application. The application ID0001: v1, the update timing at shutdown, and access information regarding access to the software management system 4000 are transmitted (2001).

Then, at the timing when the device 2000 is shut down (2002), the software management system 4000 is instructed to acquire ID0001:v1.1 (2003). The application is acquired (2004) and installed. If the installation is completed, the network device 2000 notifies the device management server 1000 that the installation is completed (732).

Consequently, when the device 2000 is shut down, it is possible to download and install V1.1, which is the latest version of the panel application ID0001 that needs to be updated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-033873, filed Feb. 27, 2019, which is hereby incorporated by reference herein in its entirety.

What is claimed is:

1. A device management server that manages information regarding a first application associated with a product key, and information regarding a second application that is not managed based on a product key, the device management server comprising:
   at least one memory storing instructions; and
   at least one processor executing the instructions causing the device management server to:
   create a first task for distributing to a network device a first application associated with a product key that can be selected by specifying the product key;
   create a second task for distributing to the network device a second application selected without specifying a product key;
   in a case where the second task is executed, acquire version information regarding the second application installed on the network device as a target; and
   based on the acquired version information, perform control to distribute a newer version of the second application to the target network device.

2. The device management server according to claim 1, wherein the instructions further cause the device management server to, before the creation of the first task, save a template created in a state where the product key is specified, and to be used to create the first task for which the first application is set.

3. The device management server according to claim 1, wherein the instructions further cause the device management server to display a screen that inquires of a user about whether a selection is made to maintain the second application in the latest state, and wherein in a case where a selection is made to maintain the second application in the latest state, periodic execution is set for the second task.

4. The device management server according to claim 1, wherein the instructions further cause the device management server to display a screen that inquires of a user about a selection of an execution schedule for the second task.

5. The device management server according to claim 1, wherein the instructions further cause the device management server to:
- display a list of second applications that can be distributed to the network device; and
- display a screen that inquires of a user about a selection of a second application as a distribution target among the second applications.

6. The device management server according to claim 1, wherein the instructions further cause the device management server to display a screen that inquires of a user about a selection of a type of the second application to be distributed to the network device.

7. The device management server according to claim 1, wherein the instructions further cause the device management server to display a screen that inquires of a user about a selection of an acquisition method by which the network device acquires the second application.

8. The device management server according to claim 7, wherein in a case where an acquisition method by which the network device directly acquires the second application is set for the second task, as the acquisition method, information regarding the second application is distributed to the network device.

9. A control method for a device management server, the device management server managing information regarding a first application associated with a product key, and information regarding a second application that is not managed based on a product key, the control method comprising:
- creating a first task for distributing to a network device a first application associated with a product key that can be selected by specifying the product key;
- creating a second task for distributing to the network device a second application selected without specifying a product key;
- in a case where the second task is executed, acquiring version information regarding the second application installed on the network device as a target; and
- based on the acquired version information, performing control to distribute a newer version of the second application to the target network device.

10. A non-transitory computer-readable storage medium having computer executable instructions stored thereon, wherein the instructions cause a computer as a device management server to:
- create a first task for distributing to a network device a first application associated with a product key that can be selected by specifying the product key;
- create a second task for distributing to the network device a second application selected without specifying a product key;
- in a case where the second task is executed, acquire version information regarding the second application installed on the network device as a target; and
- based on the acquired version information, perform control to distribute a newer version of the second application to the target network device.

* * * * *